United States Patent

Yoshimura et al.

Patent Number: 5,311,795
Date of Patent: May 17, 1994

[54] CONTROL SYSTEM WITH BAND BRAKE ACTUATOR FOR AUTOMATIC TRANSMISSION

[75] Inventors: Hiroshi Yoshimura; Toshihisa Marusue; Masahito Kitada; Hidetoshi Kambara, all of Hiroshima, Japan

[73] Assignee: Mazda Motor Corporation, Hiroshima, Japan

[21] Appl. No.: 903,464

[22] Filed: Jun. 17, 1992

[30] Foreign Application Priority Data

Jun. 17, 1991 [JP] Japan .................. 3-144775
Sep. 10, 1991 [JP] Japan .................. 3-230213

[51] Int. Cl.$^5$ .............................................. F16H 61/04
[52] U.S. Cl. ................................. 74/867; 74/869
[58] Field of Search .................. 74/867, 868, 869

[56] References Cited

U.S. PATENT DOCUMENTS

| | | | |
|---|---|---|---|
| 4,484,654 | 11/1984 | Hayakawa | 74/867 X |
| 4,519,273 | 5/1985 | Shimizu et al. | 74/867 X |
| 4,616,531 | 10/1986 | Ogasawara et al. | 74/867 X |
| 4,667,540 | 5/1987 | Yagi | 74/867 X |
| 4,729,265 | 3/1988 | Sugano | 74/868 |
| 4,934,218 | 6/1990 | Takase et al. | 74/868 |
| 5,027,676 | 7/1991 | Fujiwara et al. | 74/867 X |
| 5,038,637 | 8/1991 | Sugano | 74/868 |

FOREIGN PATENT DOCUMENTS 61-45157 3/1986 Japan .

Primary Examiner—Leslie A. Braun
Assistant Examiner—Khoi Ta
Attorney, Agent, or Firm—Keck, Mahin & Cate

[57] ABSTRACT

A control system controls a second to third gear shift of an automatic transmission in an advantageous way. The transmission has a 3-4 clutch, which is locked under hydraulic pressure, and a 2-3 brake provided with a lock pressure chamber and an unlock pressure chamber. The 2-3 brake is locked when a hydraulic pressure is developed in the lock pressure chamber only and is unlocked when a fluid pressure is developed in the unlock pressure chamber and when a hydraulic pressure is released from both the lock pressure chamber and the unlock pressure chamber. Hydraulic pressure is released from the lock pressure chamber so as to unlock the 2-4 brake only when a second to third gear shift is needed for the first time after engine ignition simultaneously with application of pressure to the 3-4 clutch so as to lock the 3-4 clutch. Other than when a second to third gear shift is needed for the first time after engine ignition, pressure is supplied into the unlock pressure chamber while keeping the lock pressure chamber supplied with pressure so as to unlock the 2-4 brake.

4 Claims, 12 Drawing Sheets

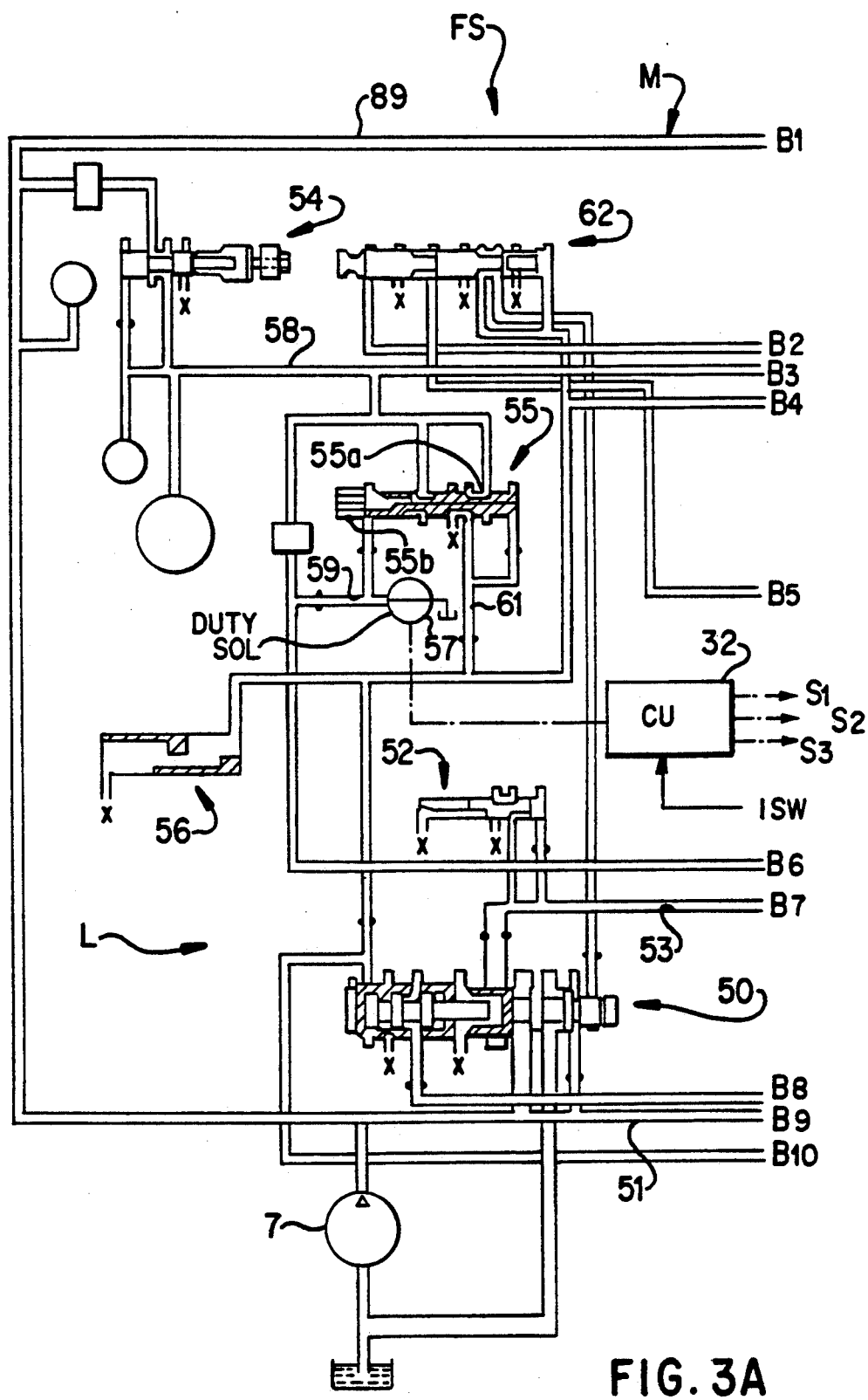

CONTROL SYSTEM WITH BAND BRAKE ACTUATOR FOR AUTOMATIC TRANSMISSION

BACKGROUND OF THE INVENTION

1. Field of the Invention

This invention relates to an automatic transmission control system for an automotive vehicle.

Generally, an automatic transmission for an automotive vehicle is equipped with a torque converter and a transmission gear mechanism. The torque converter converts engine torque and transmits it to the transmission gear mechanism. The transmission gear mechanism transmits the torque to driving wheels and outputs reverse rotation to the driving wheels when it is in reverse gear.

The transmission gear mechanism, which typically includes a planetary gearset, has a plurality of frictional coupling elements, such as clutches, by which the turbine shaft and gears of the planetary gearset are selectively locked together and unlocked, and brakes, by which the gears are selectively fixed and released. These clutches and brakes are operated by means of a hydraulic control system or circuit so as to change a torque transmission path of the transmission gear mechanism, thereby shifting the automatic transmission.

2. Description of Related Art

When such an automatic transmission shifts up, for instance, from second gear to third gear, the hydraulic control system, on one hand, releases a 2-4 brake and, on the other hand, locks a 3-4 clutch and a coast clutch. The 2-4 brake, which is typically a band brake equipped with a servo piston, is fixed when hydraulic pressure is supplied into a fix or lock pressure chamber only and is released when a hydraulic pressure is supplied into a release or unlock pressure chamber and when a hydraulic pressure is released from both the lock pressure chamber and the unlock pressure chamber. Since a lock pressure is developed in the lock pressure chamber when the automatic transmission is in second gear, the hydraulic control system supplies an unlock pressure to the unlock pressure chamber and the 3-4 clutch for shifting up the automatic transmission from second gear to third gear in order to unlock the 2-4 brake and lock the 3-4 clutch.

If a hydraulic pressure is simply supplied to both the unlock pressure chamber of the 2-4 brake and the 3-4 clutch when an up-shift from second gear to third gear is needed, the transmission gear mechanism is subjected to shift shock and internal locking or double locking by conditions in which a hydraulic pressure is supplied to the 3-4 clutch and the 2-4 brake or by a timing at which the 3-4 clutch and the 2-4 brake are operated. In an attempt to eliminate such shift shocks and internal locking, a hydraulic control system of the automatic transmission is provided with a 2-3 timing valve for controlling an unlock pressure supplied to the unlock pressure chamber of the 2-4 brake in response to a hydraulic pressure supplied to the 3-4 clutch in an oil passage to the unlock pressure chamber of the 2-4 brake. Such a hydraulic control system is known from, for instance, Japanese Unexamined Patent Publication, No. 61-45,157. In an automatic transmission controlled by a hydraulic control system, having the 2-3 timing valve enables the 3-4 clutch and the 2-4 brake to operate at an appropriate timing, so as to prevent the automatic transmission from causing internal locking.

If a vehicle provided with an automatic transmission remains stopped for a long period of time, accidental inclusion of air into oil of the hydraulic control system may occur. If the air included in the oil stays in the releasing pressure chamber of the 2-4 brake, a delay in the development of an unlock pressure in the unlock pressure chamber may arise, due to the air inclusion, when an upshift from second gear to third gear takes place after restarting the vehicle. Consequently, the timing of operation between the 3-4 brake and the 2-4 brake lags. This leads to shift shocks and internal locking.

Some of the frictional coupling elements of the automatic transmission are provided with what is referred to here as a "drift-on-ball" mechanism, cooperating with either a piston of the friction element or a drum of the friction element, in order to prevent the coupling elements from operating accidentally. Such a drift-on-ball mechanism includes a bore, penetrating through either the piston or the drum, and a ball. The ball is seated on and unseated from a ball seat of the bore. While the frictional coupling element is locked up, the ball is urged to be seated on the seat by means of locking force acting on the piston or the drum so as to close the bore for assured piston operation. While the frictional coupling element is unlocked, the ball is unseated from the seat by means of centrifugal force, generated by rotation of the frictional coupling element, so as to permit hydraulic pressure acting on the piston to escape through the bore. Letting the hydraulic pressure acting on the piston to escape prevents an increase in hydraulic pressure, and hence an increase in locking force, acting on the piston while the frictional coupling element rotates at a high speed. Accidental lock-up of the frictional coupling element is eliminated, therefore.

However, when the drift-on-ball mechanism is installed in a first frictional coupling element, such as a 3-4 clutch, it has been found that there are some gear shift operations in which the 3-4 clutch can not be locked adequately. That is, when the automatic transmission shifts to a specific gear in which the 3-4 clutch must be locked, although a locking force acts on the piston of the drift-on-ball mechanism installed in the 3-4 clutch, it is necessary, in order to enable the ball of the drift-on-ball mechanism to operate, to seat the ball on the seat, overcoming the centrifugal force acting on the 3-4 clutch. For this reason, the larger that the centrifugal force acting on the 3-4 clutch is, the larger the locking force is required to be. However, a line pressure, acting as the locking force, is restricted to a certain maximum value by features of a hydraulic control circuit. This may prevent the ball from being seated on the seat. This, in turn, results in failure to maintain hydraulic pressure acting on the piston, so that the hydraulic pressure does not increase to a desired pressure which is necessary to displace the piston a predetermined distance which allows slippage of the 3-4 clutch. Consequently, the operational reliability of the 3-4 clutch is lowered.

SUMMARY OF THE INVENTION

It is an object of the present invention to provide a control system for hydraulically controlling an automatic transmission so that frictional coupling elements are locked and unlocked at appropriate times so as to shift the automatic transmission without accompanying shift shocks, even if air remains included in the oil supplied to the friction coupling elements.

It is another object of the present invention to provide a control system for hydraulically controlling an automatic transmission which provides a large locking force for a drift-on-ball type of frictional coupling element so as to ensure locking of the frictional coupling element even while the frictional coupling element rotates at a high speed.

The objects of this invention mentioned above are accomplished by providing a control system for controlling shift operations of an automatic transmission which has a first frictional coupling element, such as a 3-4 clutch, which is locked, in third and fourth gears, under a hydraulic pressure, and a second frictional coupling element, provided with a lock pressure chamber and an unlock pressure chamber, such as a 2-4 brake, which is locked, in second and fourth gears, when a hydraulic pressure is developed in the lock pressure chamber only and is unlocked when a fluid pressure is developed in the unlock pressure chamber and when a hydraulic pressure is released from both the lock pressure chamber and the unlock pressure chamber. The control system supplies a hydraulic pressure to the first frictional coupling element so as to lock the first frictional coupling element, and releases a hydraulic pressure from the lock pressure chamber of the second frictional coupling element so as to unlock the second frictional coupling element, when a predetermined gear shift, such as a second to third gear shift, is needed for the first time after an engine ignition. Other than a first time second to third gear shift after engine ignition, the control system supplies a hydraulic pressure into the unlock pressure chamber, while the lock pressure chamber is kept supplied with a hydraulic pressure, so as to unlock the second frictional coupling element. This pressure supply to the unlock pressure chamber of the second frictional coupling element is controlled, by a timing valve, so as to correspond to a hydraulic pressure supplied to the first frictional coupling element.

The automatic transmission gear shift control system releases a hydraulic pressure from the lock pressure chamber of the second frictional coupling element so as to unlock the second frictional coupling element for shifting the automatic transmission to the predetermined gear when input speeds of the automatic transmission are detected to be higher than a predetermined speed. The system also supplies a hydraulic pressure into the unlock pressure chamber of the second frictional coupling element so as to unlock the second frictional coupling element for shifting the automatic transmission to the predetermined gear when input speeds of the automatic transmission are detected to be lower than the predetermined speed.

In the automatic transmission gear shift control system of the invention, because the first and second frictional coupling elements are locked and unlocked at timings appropriate for an ordinary predetermined gear shift of the automatic transmission, no shift shock is caused due to air inclusion in the hydraulic control oil. In addition, if the predetermined gear shift of the automatic transmission is needed for the first time after a long period, during which operation of the automatic transmission has been interrupted and air inclusion in the hydraulic control oil may have been induced, then the second frictional coupling element is unlocked by releasing a hydraulic pressure from the lock pressure chamber. The second frictional element, therefore, is unlocked at an appropriate timing, thereby inclusion in the hydraulic control oil.

Since unlocking of the second frictional coupling element is performed by releasing the lock pressure therefrom, pressure is supplied to the first frictional coupling element only during the predetermined gear shift. Accordingly, a large amount of oil can act on a piston of a drift-on-ball clutch, if such a clutch is used for the first frictional coupling element. The input speed of the automatic transmission may go beyond the predetermined speed and, accordingly, generates a strong centrifugal force, which is applied to a drift-on-ball of the drift-on-ball clutch. However, because a large amount of oil can act on the piston of the drift-on-ball clutch, even if a pressure necessary to seat the drift-on-ball on its seat, and thereby fluid-tightly close a bore of the drift-on-ball clutch, is in excess of a maximum line pressure generated by a regulating valve, the force acting on the piston becomes higher than the line pressure because a large amount of oil is supplied to the drift-on-ball clutch. Thus, the drift-on-ball is firmly urged against the seat with a force sufficiently strong to fluid-tightly close the bore. This results in providing an improved operational reliability of the drift-on-ball clutch.

On the other hand, although the predetermined gear shift of the automatic transmission may be needed, the input speed of the automatic transmission could be lower than the predetermined speed. Also, a force necessary to seat the drift-on-ball on its seat may be less than the maximum line pressure generated by the regulating valve. In either of these conditions, the second frictional coupling element is unlocked by being supplied with an unlock pressure. During unlocking of the second frictional coupling element, in spite of a drop in the amount of the working oil supplied to the first frictional coupling element, which is equivalent to the amount of working oil supplied to the second frictional coupling element, the drift-on-ball may inherently fluid-tightly close the bore with a force which is less than the maximum line pressure. This ensures the locking of the first frictional coupling element.

Furthermore, when the second frictional coupling element is unlocked by being supplied with pressure, an unlock pressure rises, in response to a rise in a lock pressure for the first frictional coupling element, through a timing valve. This secures a correlation between locking of the first frictional coupling element and unlocking of the second frictional coupling element so as to smoothly change from one torque transmission path of the automatic transmission to another and effectively reduce shift shocks.

BRIEF DESCRIPTION OF THE DRAWINGS

The above and other objects and features of the present invention will be apparent to those skilled in the art from the following description of a preferred embodiment thereof when considered in conjunction with the accompanying drawings, in which.

DETAILED DESCRIPTION OF THE PREFERRED EMBODIMENT

Figure 1:
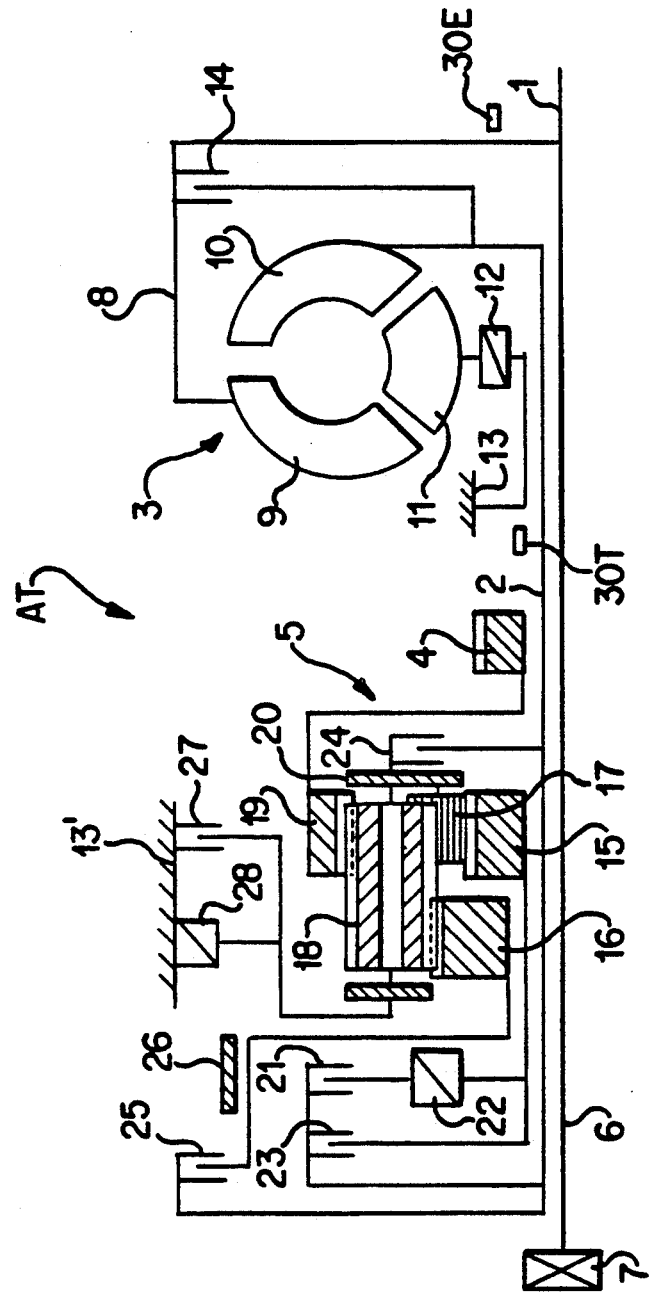
FIG. 1 is a skeleton diagram illustrating an automatic transmission.

Referring to the drawings in detail and, in particular, to FIG. 1, an automatic transmission for an automotive vehicle according to a preferred embodiment of the invention is generally designated by reference character AT. The automatic transmission AT includes a torque converter 3 and a transmission gear mechanism 5. The torque converter 3 has an impeller 9 fastened to an engine output shaft 1 through a connection member 8, a turbine 10 fastened to the turbine shaft 2, and a stator 11 disposed between the impeller 9 and the turbine 10 and secured to a transmission casing 13 through a one-Way clutch 12. The turbine 10 is driven by Working oil discharged by the impeller 9. The stator 11 regulates the working oil circulating from the turbine 10 to the impeller 9 in a direction in which revolution of the impeller 9 is enhanced. The torque converter 3 may be, if necessary, equipped with a lock-up clutch 14 for mechanically coupling the output shaft 1 and the turbine shaft 2 together. The turbine shaft 2, which is made of a hollow tube, is coaxially mounted on an oil pump shaft 6 which is connected at one end to the engine output shaft 1 and at the other end to an oil pump 7. The torque converter 3, thus structured, transmits all available engine torque and multiplies the engine torque at a ratio corresponding to the difference between speeds of the impeller 9 and the turbine 10. The engine torque is transmitted, by the transmission gear mechanism 5, to driving wheels through an output gear 4.

Transmission gear mechanism 5, which is of a type having a planetary gearset well known in the art, includes various gears, such as sun gears 15 and 16, a plurality of pinion gears 17 and 18, and a ring gear 19. The sun gear 15, which has a small diameter and, accordingly, is referred to as a small sun gear, is mounted for rotation on the turbine shaft 2. The sun gear 16, which has a large diameter and, accordingly, is referred to as a large sun gear, is mounted for rotation on the turbine shaft 2 on the rear side of the small sun gear 15. A plurality of pinion gears 17 (only one of which is illustrated and which are referred to as short pinion gears) is disposed around the small sun gear 15 so as to mesh with the small sun gear 15. The pinion gear 18, which is longer than the short pinion gears 17 and, accordingly, is referred to as a long pinion gear, meshes with the short pinion gears 17 at its front portion and with the large sun gear 16 at its rear portion. The ring gear 19 meshes with the long pinion gear 18 and is connected to the output gear 4. The short pinion gears 17 and the long pinion gear 18 are carried for rotation by a carrier 20. The transmission gear mechanism 5, on one hand, selectively assigns one of the small sun gear 15, the large sun gear 16 and the carrier 20 to a torque input element in accordance with transmission gears and, on the other hand, definitely assigns the ring gear 19 to a torque output element for all of the transmission gears.

Transmission gear mechanism 5 is provided with a plurality of clutches and brakes in order to switch its torque transmission path for establishing different torque ratios and reversing the direction of rotation of the output gear 4. Specifically, a forward clutch 21 and a first one-way clutch 22 are provided, in series, between the turbine shaft 2 and the small sun gear 15 A coast clutch 23 is provided, between the turbine shaft 2 and the small sun gear 15, in parallel with the clutches 21 and 22 with respect to the small sun gear 15. A 3-4 clutch 24, which may be of the drift-on-ball type, is provided between the turbine shaft 2 and the carrier 20, and a reverse clutch 25 is provided between the turbine shaft 2 and the large sun gear 16. A 2-4 brake 26, which has a servo-piston operated brake band for locking or fixing the large sun gear 16 in a specific gear, is provided between the large sun gear 16 and the reverse clutch 25. Between the carrier 20 and the transmission casing 13', there are provided a low-reverse brake 27 for fixing the carrier 20 in a specific range and a specific gear, and a second one-way clutch 28 for receiving the reaction force of the carrier 20. The brake 27 and clutch 28 are in parallel with each other. The automatic transmission AT is provided with a turbine speed sensor 30T for detecting the rotational speed of the turbine shaft 2, and an engine speed sensor 30E for detecting the speed of the output shaft 1 and, therefore, the engine speed.

Figure 2:
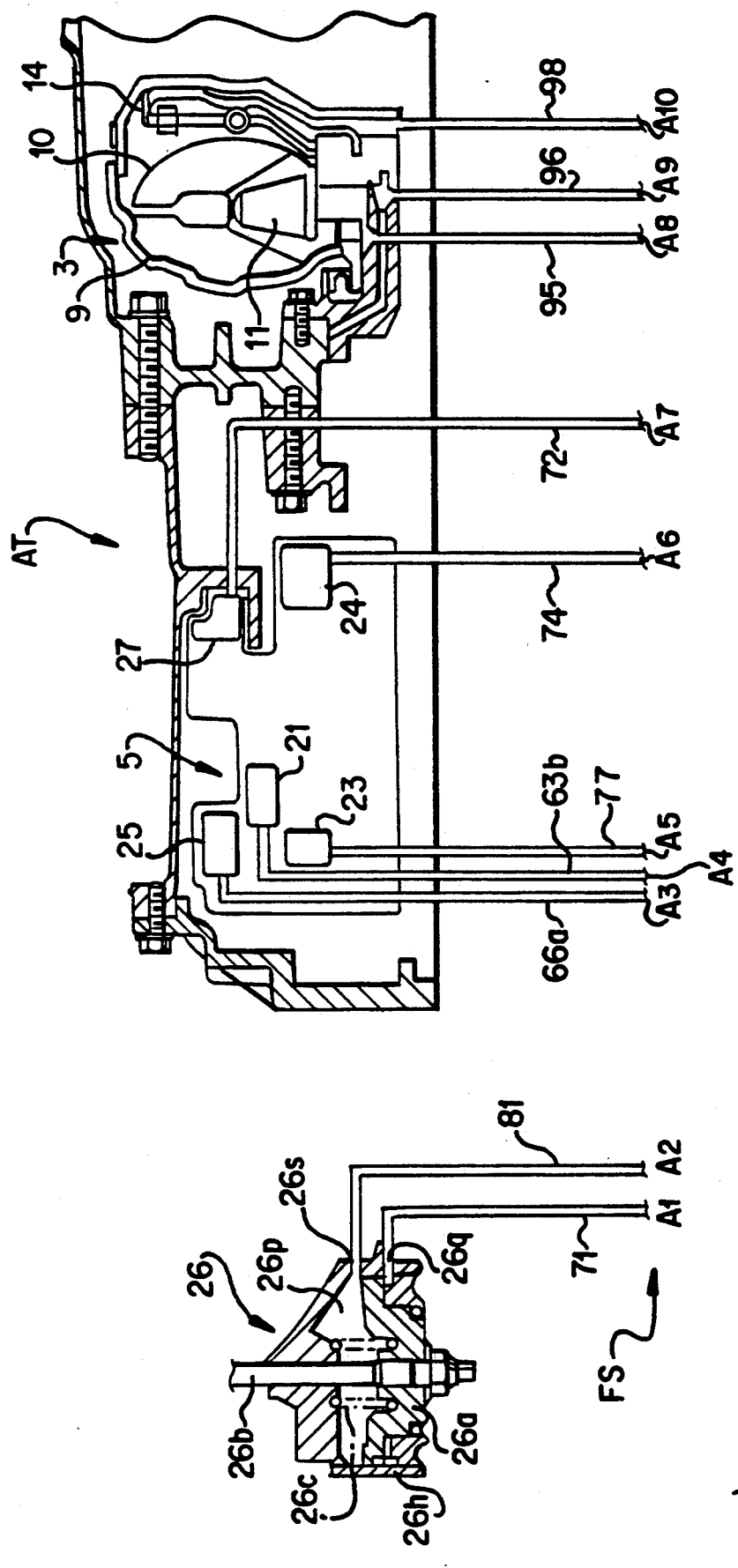
FIG. 2 is an illustration showing hydraulically controlled frictional coupling elements of the automatic transmission of FIG. 1.

As is shown in detail in FIG. 2, the 2-4 brake 26, having a servo-piston operated brake band, has a cylindrical housing 26h, in which an open-bottom hydraulic pressure chamber 26p, is formed. The housing 26h is formed with a lock pressure port 26q and an unlock pressure port 26s, through which the pressure chamber 26p communicates with a hydraulic control system, which will be described in detail later. A piston 26a, connected to a brake band (not shown) through a piston rod 26b, is snugly received in the pressure chamber 26p and slides up and down in the pressure chamber 26p, maintaining the open bottom of the pressure chamber 26p fluid-tightly closed. The piston 26a is normally forced down by a spring 26c so as to communicate the pressure chamber 26p with the hydraulic control system through the unlock pressure port 26s. When a lock pressure is developed at the lock pressure port 26q only, the piston 26a is forced up against the force of the spring 26c so as to bring the 2-4 brake 26 into its lock state. On the other hand, when pressure is developed at both the lock pressure port 26q and the unlock pressure port 26s and when pressure is removed from both the lock pressure port 26q and the unlock pressure port 26s, the piston 26a is forced down by the spring 26c so as to bring the 2-4 brake 26 into its unlock state. All the frictional coupling elements, except for the 2-4 brake 26, are locked during the presence of hydraulic pressure and are unlocked during the absence of hydraulic pressure.

Clutches 21, 23, 24 and 25 and brakes 26 and 27 are selectively locked and unlocked so as to shift the automatic transmission AT to necessary ranges and gears as is shown in Table I. In Table I, each element is indicated as being locked or fixed in a range and gear indicated by a symbol "ON." Otherwise, the element is unlocked or released.

TABLE I

| Range | | Clutch | | | | Brake | | One-Way Clutch | |
|---|---|---|---|---|---|---|---|---|---|
| | | Forward | Coast | 3-4 | Rev. | 2-4 | n-Rev. | 1ST | 2ND |
| Park | | | | | | | | | |
| Reverse | | | | | ON | | ON | | |
| Neutral | | | | | | | | | |
| Drive | 1st Gear | ON | | | | | | ON | |
| | 2nd Gear | ON | | | | ON | | ON | |
| | 3rd Gear | ON | ON | ON | | | | ON | |
| | 4th Gear | ON | | ON | | ON | | | |
| 2nd | 1st Gear | ON | | | | | | ON | ON |
| | 2nd Gear | ON | ON | | | ON | | ON | |
| | 3rd Gear | ON | ON | ON | | | | ON | |
| 1st | 1st Gear | ON | ON | | | | ON | ON | ON |
| | 2nd Gear | ON | ON | | | ON | | ON | |

(1) In the P (Park) range, all elements are kept unlocked or released. No torque is transmitted from the turbine shaft 2 to the transmission gear mechanism 5 at all.

(2) In the R (Reverse) range, the reverse clutch 25 and the low-reverse brake 27 are locked, and all other elements are kept unlocked or released. Since the low-reverse brake 27 is locked, the second one-way clutch 28, disposed in parallel with the low-reverse brake 27, effects nothing in particular. The first one-way clutch 22 is brought out of a torque transmission path so as to also effect nothing in particular.

In the reverse range, torque from the turbine shaft 2 is transmitted to the large sun gear 16 through the reverse clutch 25. Because the low-reverse brake 2 locks the carrier 20, the large sun gear 16, the long pinion gear 18 and the ring gear 19 engage with one another in order to form a gear train. This reduces the torque transmitted to the large sun gear 16 at a large reduction ratio, defined by a gear ratio between the large sun gear 16 and the ring gear 19, and outputs it through the output gear 4. In the reverse range, the ring gear 19, and hence the output gear 4, turns in a direction opposite to the direction in which the large sun gear 16 and the turbine shaft 2 turn, and the drive wheels are driven in a reverse direction.

(3) In the N (Neutral) range, all elements are unlocked and in the same condition as in the P (Park) range.

(4) In the D (Drive) range, first gear condition, only the forward clutch 21 is locked, and all other elements are kept unlocked. Although the first and second one-way clutches 22 and 28 are locked, they idle during coasting.

Torque from the turbine shaft 2 is transmitted to the small sun gear 15 through the forward clutch 21 and the first one-way clutch 22. Because the second one-way clutch 28 fixes the carrier 20, the small sun gear 15, the short pinion gear 17, the long pinion gear 18 and the ring gear 19 engage with one another in order to form a gear train. This reduces the torque transmitted to the large sun gear 16 at a large reduction ratio, defined by a gear ratio between the small sun gear 15 and the ring gear 19, and outputs it through the output gear 4. The ring gear 19, and hence the output gear 4, turns in the same direction as the small sun gear 15 and the turbine shaft 2, and the drive wheels are driven in a forward direction. In the drive range, first gear condition, engine braking is not effective, due to the operation of the first one-way clutch 22.

(5) In the D (Drive) range, second gear condition, the forward clutch 21 and the 2-4 brake 26 are locked, and all other elements are kept unlocked. Although the first one-way clutch 22 is locked, it idles during coasting. The second one-wa clutch 28 always idles.

Because the large sun gear 16 is fixed, the long pinion gear 18 turns or revolves around the large sun gear 16. Accordingly, although torque is basically transmitted through the same path as in the drive range, first gear condition, the reduction ratio at which the torque is transmitted to the output gear 4 is slightly smaller than that at which the torque is transmitted in the drive range, first gear condition, because the rotational speed of the ring gear 19 is made higher by revolutions of the long pinion gear 18. In the drive range, second gear condition, engine braking is not effective, due to the operation of the first one-way clutch 22.

(6) In the D (Drive) range, third gear condition, the forward clutch 21, the coast clutch 23 and the 3-4 clutch 24 are locked, and all other elements are kept unlocked. The forward clutch 21 and the first one-way clutch 22, which are disposed in parallel with the coast clutch 23 with respect to the turbine shaft 2, effect nothing in particular, because the coast clutch 23 is kept unlocked. The second one-way clutch 28 always idles.

Because the small sun gear 15 and the carrier 20 are locked together by the coast clutch 23, the turbine shaft 2 and the 3-4 clutch 24, all of the gears 15 to 19 and the carrier 20 are locked together and rotate as one unit. This is an inherent feature of the planetary gearset. Since these elements rotate together as one unit, the turbine shaft 2 and the output shaft 4 are directly coupled together. Accordingly, torque from the turbine shaft 2 is transmitted to the output shaft 4 without any reduction, i.e., at a torque reduction ratio of 1:1. The output gear 4 turns in the same direction as the direction in which the turbine shaft 2 turns, so as to drive the drive wheels in the forward direction. In the drive range, third gear condition, in which the turbine shaft 2 and the output shaft 4 are directly coupled together, engine braking is, of course, effective.

(7) In the D (Drive) range, fourth gear condition, the forward clutch 21, the 3-4 clutch 24 and the 2-4 brake 26 are locked, and all other elements are kept unlocked.

The first and second one-way clutches 22 and 28 idle at all times. Although the forward clutch 21 is locked, the forward clutch 21 effects nothing in particular, because the first one-way clutch 22 idles at all times.

Torque from the turbine shaft is transmitted to the carrier 20 through the 3-4 clutch 24, and then to the output gear 4 through the long pinion gear 18 and the ring gear 19, in order. Because the 2-4 brake 26 fixes the large sun gear 16, the long pinion gear 18 turns by revolving around the large sun gear 16. Accordingly, since the ring gear 19 turns at a speed which, due to rotations of the long pinion gear 18, is higher than that of the carrier 20, and hence the turbine shaft 2, the transmission gear mechanism 5 is brought into an overdrive condition, in which rotational speed is multiplied. The ring gear 19 and the output gear 4 turn in the same direction as the carrier 20 and the turbine shaft 2, so as to drive the drive wheels in the forward direction.

(8) In the second (2nd) range, first gear condition, all of the elements are placed in the same condition as in the D (Drive) range, first gear condition.

(9) In the second (2nd) range; second gear condition, the forward clutch 21, the coast clutch 23 and the 2-4 brake 26 are locked and all other elements are kept unlocked. Because the coast clutch 23 is locked, the forward clutch 21 and the first one-way clutch 22, which are disposed in parallel with the coast clutch 22 with respect to the turbine shaft 2, effect nothing in particular. In the second (2nd) range, second gear condition, torque transmission and speed change are caused basically in the same manner as in the D (Drive) range, second gear condition, and engine braking is effective because the first one-way clutch 22 does nothing.

(10) In the second (2nd) range, third gear condition, all of the elements are placed in the same condition as in the D (Drive) range, third gear condition.

(11) In the first (1st) range, first gear condition, the forward clutch 21, the coast clutch 23 and the low reverse brake 27 are locked, and all other elements are kept unlocked. Because the coast clutch 23 is locked, the forward clutch 21 and the first one-way clutch 22, which are disposed in parallel with the coast clutch 23 with respect to the turbine shaft 2, provide no particular effects. Also, since the low-reverse brake 27 is locked, the second one-way clutch 28, disposed in parallel with the low-reverse brake 27 with respect to the long pinion gear 18, effects nothing in particular. Torque transmission and speed change are caused basically in the same manner as in the D (Drive) range, first gear condition, and engine braking is effective because the first and second one-way clutches 22 and 28 do nothing.

(12) In the first (1st) range, second gear condition, all of the elements are in the same conditions as in the second (2nd) range, second gear condition.

Figure 3B:
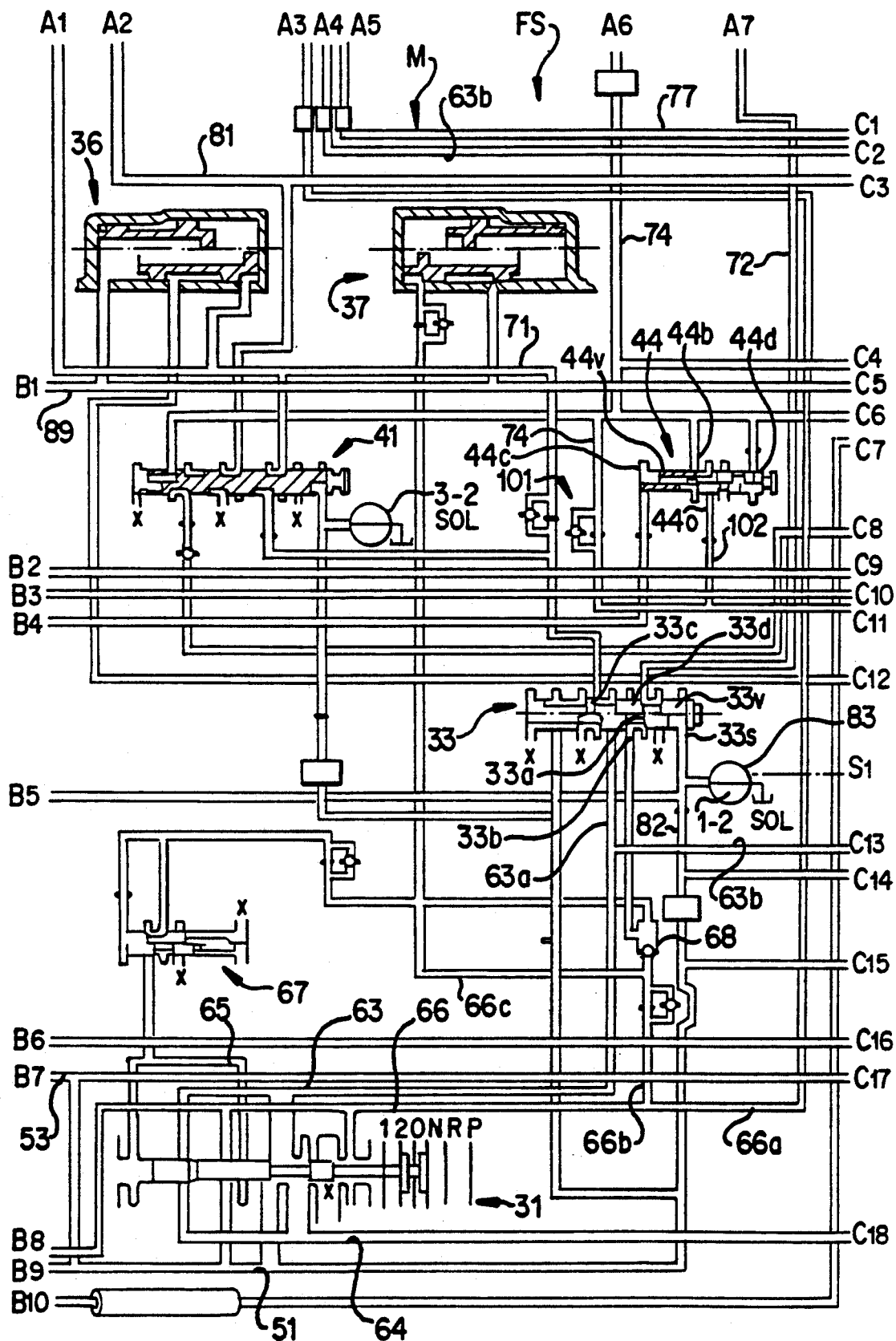
FIGS. 3(A-D) are diagrams showing a hydraulic control circuit for the automatic transmission of FIG. 1.
Figure 3C:
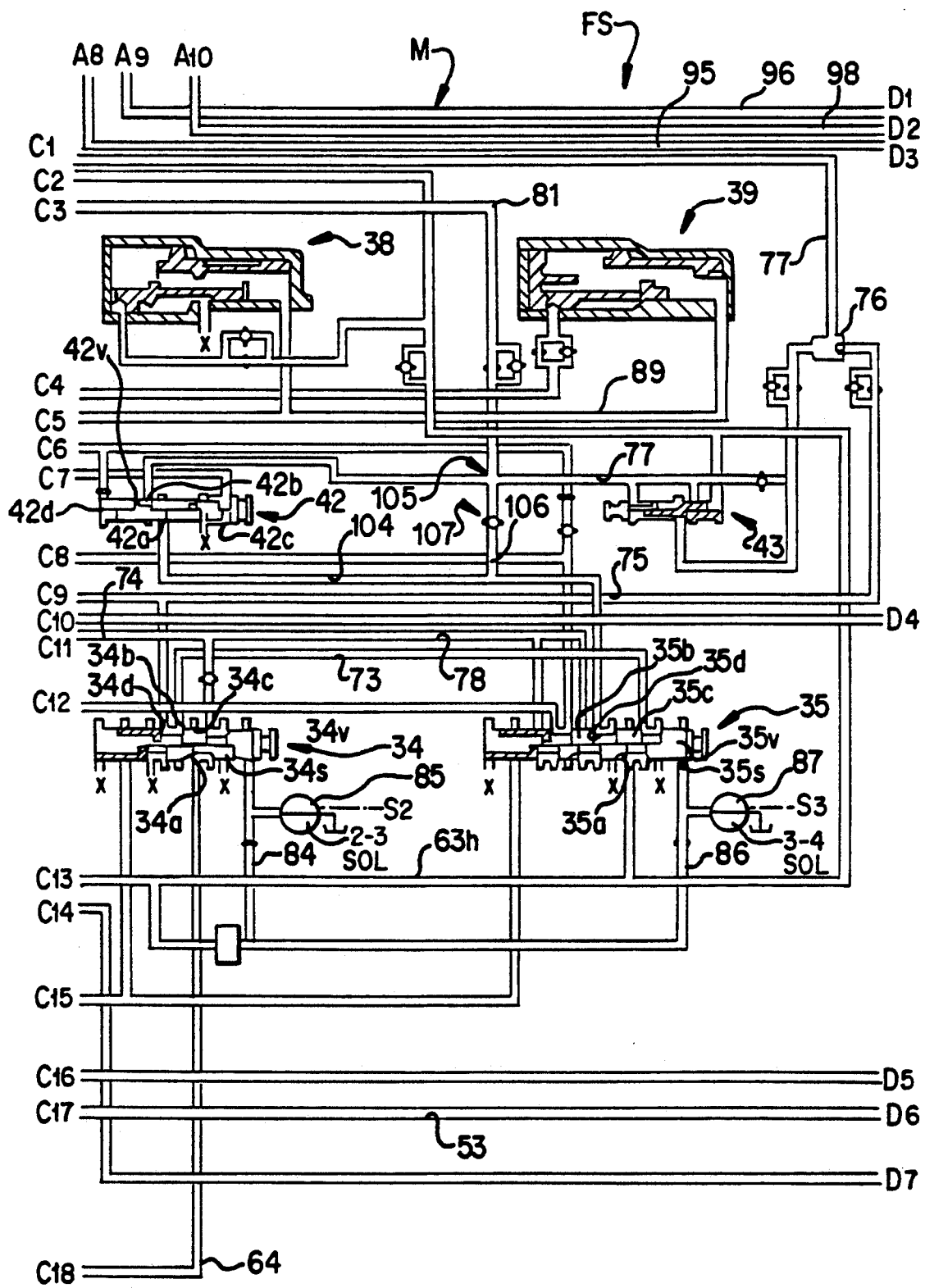
Figure 3D:
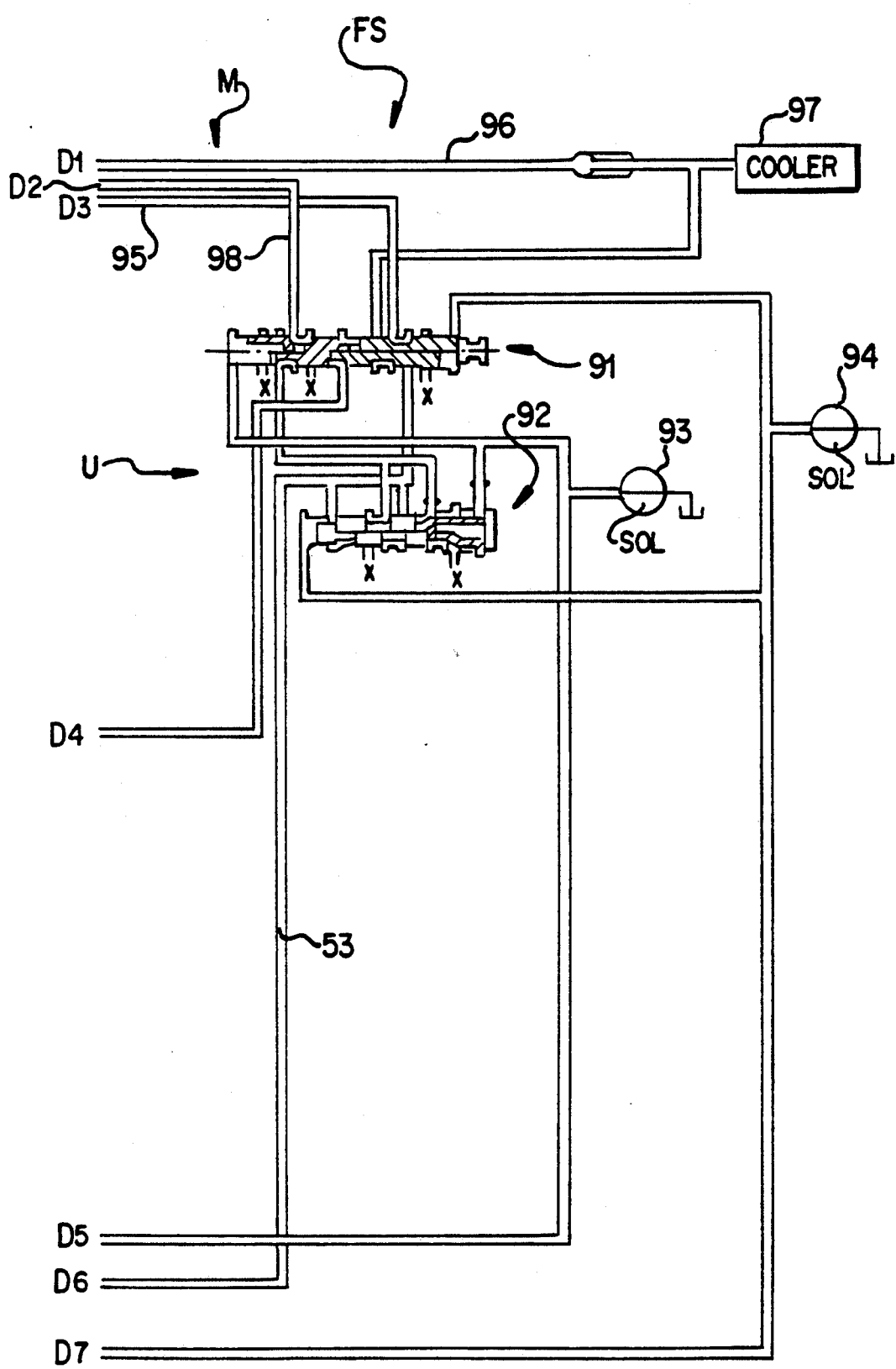

The operation of the frictional coupling elements is controlled and the elements ar selectively locked and unlocked by a hydraulic control system shown in FIG. 3. The hydraulic control system Fs includes a line pressure control mechanism L for controlling a line or fundamental pressure, a hydraulic passage network M formed by a number of passages for feeding a hydraulic pressure to respective parts and releasing it from the parts, and a lock-up control mechanism U for controlling the hydraulic pressure supplied to the torque converter 3 and the lock-up clutch 14. The hydraulic control system FS includes various valves, such as a manual valve 31, shift valves 33, 34 and 35, timing valves 41, 42 and 43, and a bypass valve 44. The manual valve 31 is shifted in response to a shift or selector lever (not shown) so as to change from one set of line pressure passages to another. The shift valves 33 to 35 are electrically operated by a control unit (CU) 32, mainly formed by a microcomputer, to shift according to shifted positions of the manual valve 3 and drive conditions of the vehicle such as a vehicle speed and a throttle opening. The timing valves 41, 42 and 43 cooperate with the bypass valve 44 so as to adjust a timing at which a hydraulic pressure is supplied to and released from the specific frictional coupling elements. The hydraulic control system FS further includes accumulators 36 to 39 for cushioning the supply of hydraulic pressure to specific frictional coupling elements and the release of hydraulic pressure from specific frictional coupling elements. The hydraulic passage network M is formed with a plurality of orifices and is provided with one-way valves so as to control fluid resistance of its specific parts. In the drawings, the orifices and the one-way valves are illustrated by generally used symbols or marks and are not designated by reference numbers.

Hydraulic control system FS variably controls hydraulic pressure acting on the frictional elements according to the ranges, i.e., park, reverse, neutral, drive, 2nd and 1st ranges, and drive conditions of the vehicle, so as to shift gears of the transmission gear mechanism 5. The line pressure control mechanism L generates a hydraulic or line pressure in a line pressure passage 51, which is regulated by a regulating valve 50 so as to be substantially proportional to a pilot pressure for the regulating valve 50. The line pressure, thus regulated, is supplied to the manual valve 31 and the other valves. The line pressure in the line pressure passage 51 is, after being regulated by the regulating valve 50, also supplied to the torque converter 3 through a hydraulic passage 53, in which a relief valve 52 is provided. The pilot pressure for the regulating valve 50 is developed by a pressure reducing valve 54, a modulator valve 55, a line pressure control accumulator 56, and a line pressure control solenoid valve 57 having a duty ratio which is controlled by the control unit (CU) 32.

In more detail, the line pressure in the line pressure passage 51, after being reduced by the pressure reducing valve 54, is introduced to an inlet port 55a of the modulator valve 55 through a reduced pressure passage 58. The line pressure is also introduced to the modulator valve 55 at its control port 55b through the reduced pressure passage 58 and a duty pressure passage 59. The hydraulic pressure introduced to the modulator valve 55 at the control port 55b is controlled by the line pressure control solenoid valve 57, which is controlled by the control unit (CU) 32 so as to open and close at an appropriate duty ratio. The duty ratio is variably set at the control unit (CU) 32 based on vehicle driving conditions, such as a throttle valve opening, a vehicle speed, a gear range of the automatic transmission, etc. A hydraulic pressure, corresponding to the hydraulic pressure introduced to the modulator valve 55 at the control port 55b, is transmitted into a pilot pressure passage 61 as pilot pressure for the regulating valve 50. Vibrations or pulsations of hydraulic pressure in the pilot pressure passage 61 are absorbed by the line pressure control accumulator 56. The regulating valve 50 generates a line pressure proportional to the pilot pressure thus developed and supplies it to the line pressure passage 51. The pilot pressure in the pilot pressure passage 61 is also supplied to a cut-back valve 62 which will be described later.

Manual valve 31 is shifted in cooperation with the shift lever (not shown) to communicate the line pressure passage 51 with working pressure passages so as to shift the automatic transmission AT to a range manually selected by the shift lever. In more detail, the line pressure passage 51 is brought by the manual valve 31 into communication with first and second main pressure supply passages 63 and 64 when the shift lever selects the drive (D) range and the second (2nd) range, first and third main pressure supply passages 63 and 65 when the shift lever selects the first (1st) range, and a reverse pressure passage 66 when the shift lever selects the reverse (R) range. The line pressure passage 51 is disconnected from communication with the pressure passages 63 to 66 when the shift lever selects the park (P) range and the neutral (N) range.

First main pressure passage 63 branches off into a pressure passage 63a for a 1-2 shift valve 33 and a pressure passage 63b for the forward clutch 21. The pressure passage 63a is in communication with the 1-2 shift valve 33 at its first inlet port 33a. The pressure passage 63b branches off into two passages so as to communicate with a 3-4 shift valve 35, at its first inlet port 35a, and the forward clutch 21, respectively. The second main pressure passage 64 is in communication with a 2-3 shift valve 34 at its first inlet port 34a. The third main pressure passage 65 is connected to a second branch pressure passage 66b of the reverse pressure passage 66, which will be described later, through a low pressure reducing valve 67 and a ball valve 68, and thereafter, communicated with the 1-2 shift valve 33 at its second inlet port 33b. The reverse pressure passage 66 branches off into a first branch passage 66a and the second branch passage 66b. The first branch passage 66a is in communication with the reverse clutch 25, and the second branch passage 66b is in communication with the 1-2 shift valve 33 through the ball valve 68.

Shift valves 33 to 35 are controlled by the control unit (CU) 32 so as to convert pressure at their inlet ports in accordance with selected ranges and gears and provide the converted pressure at their outlet ports. The converted pressure is supplied to their related frictional coupling elements. The shift valves 33 to 35 are also provided to release the pressure from the frictional coupling elements. That is, the 1-2 shift valve 33 is provided with the first and second inlet ports 33a and 33b and the first and second outlet ports 33c and 33d. The first outlet port 33c is in communication with the lock pressure port 26q of the 2-4 brake 26 through a pressure supply passage 71. The second outlet port 33d is in communication with the low reverse brake 27 through a pressure passage 72. The 2-3 shift valve 34 is provided with the first and second inlet ports 34a and 34b and first and second outlet ports 34c and 34d. The second inlet port 34b is in communication with a first outlet port 35c of the 3-4 shift valve 35 through a first connecting passage 73. The first outlet port 34c is in communication with the 3-4 clutch 24 through a pressure passage 74. The second outlet port 34d is in communication with the coast clutch 23 through a second connecting passage 75, a ball valve 76, and a pressure passage 77 for a coast clutch, which will be described later. A third connecting passage 78, branching off from the pressure passage 74 for the 3-4 clutch, is connected to the 3-4 shift valve 35 at its second inlet port 35b. The 3-4 shift valve 35 is provided with the first and second inlet ports 35a and 35b and the first and second outlet ports 35c and 35d. The second outlet port 35d is in communication with an unlock pressure port 26s of the 2-4 brake 26 through a pressure passage 81 and the coast clutch 23 through the pressure passage 77. The pressure passage 81 and the pressure passage 77 are joined together near the second outlet port 35d of the 3-4 shift valve 35.

Shift valves 33, 34 and 35 switch over their pressure transmission paths by shifting their valve spools 33v, 34v and 35v, respectively, between their extreme positions for locking and unlocking. As viewed in FIG. 3, a lock position and an unlock position are at the right end of movement of the spool and the left end of movement of the spool, respectively. In FIG. 3, the upper half of the valve spools are shown as being in the lock position, and the lower half of the spools are shown as being in the unlock position. Each spool 33v, 34v or 35v is forced to occupy its unlocked position when the pilot pressure is present in control pressure chambers 33s, 34s or 35s provided at the right end of the shift valves 33, 34 or 35, respectively, and returns to its lock position when the pilot pressure is released from the control pressure chambers 33s, 34s or 35s.

Control pressure chamber 33s of the 1-2 shift valve 33 is in communication with a first control pressure passage 82 branching off from the line pressure passage 51. The first control pressure passage 82 is provided with a first solenoid valve 83, which is controlled by the control unit (CU) 32 to turn on and off. When the first solenoid valve 83 is turned on, a pilot pressure of the control oil chamber 33s of the 1-2 shift valve 33 is released through the first control pressure passage 82, so that the valve spool 33v returns to the lock position. Simultaneously, the 1-2 shift valve 33 brings the first inlet port 33a and the first outlet port 33c into communication with each other and the second outlet port 33d and one of the drain ports (which are indicated by the symbol X) into communication with each other so as to release the pressure at the second outlet port 33d. On the other hand, when the first solenoid valve 83 is turned off, a pilot pressure is supplied into the control pressure chamber 33s of the 1-2 shift valve 33, forcing the spool 33v to occupy the unlock position, so as to release a pressure at the first outlet port 33c and bring the second inlet port 33b and the second outlet port 33d into communication with each other.

Control pressure chamber 34s of the 2-3 shift valve 34 is in communication with a second control pressure passage 84 branching off from the pressure passage 63b for the forward clutch 21. The second control pressure passage 84 is provided with a second solenoid valve 85, which is controlled by the control unit (CU) 32 to turn on and off. In the same manner as described above for the 1-2 shift valve 33, the spool 34v of the 2-3 shift valve 34 occupies the lock position and unlock position corresponding to turning on and off of the second solenoid valve 85. When the spool 34v occupies the lock position, the 2-3 shift valve 34 releases a pressure at the first outlet port 34c and brings the second inlet port 34b and the second outlet port 34d into communication with each other. On the other hand, when the spool 34v occupies the unlock position, the 2-3 shift valve 34 releases a pressure at the second outlet port 34d and brings the first inlet port 34a and the first outlet port 34c into communication with each other.

Similarly, the control oil chamber 35s of the 3-4 shift valve 35 is in communication with a third control pressure passage 86 branching off from the second control pressure passage 84. The third control pressure passage 86 is provided with a third solenoid valve 87, which is controlled by the control unit (CU) 32 to turn on and off. The spool 35v occupies either the lock position or the unlock position in response to the turning on and off of the third solenoid valve 87. When the spool 35v occupies the lock position, the 3-4 shift valve 35 releases a pressure at both the first and second outlet ports 35c and 35d. On the other hand, when the spool 34v occupies the unlock position, the 3-4 shift valve 35 brings the first inlet ports 35a and the first outlet ports 34c, and the second inlet ports 35d and the second outlet port 35d, into communication with each other, respectively.

In order to prevent the frictional coupling elements from causing shocks due to both an abrupt supply of hydraulic pressure to the frictional coupling elements and an abrupt release of hydraulic pressure from the frictional coupling elements, accumulators 36, 37, 38, and 39 are provided in the pressure supply passage 71, the second branch pressure passage 66b of the reverse pressure passage 66, the pressure passage 63b for the forward clutch 21, and the pressure passage 74 for the 3-4 clutch 24, respectively. Each accumulator 36 to 39 is supplied with a line pressure, as back pressure, through a back pressure passage 89 branching off from the line pressure passage 51. In addition, in order to prevent the transmission gear mechanism 5 from causing internal locking or double locking during range and gear shifts, the hydraulic control system FS is provided with various timing valves, such as a 3-2 timing valve 41, a 2-3 timing valve 42, a coast timing valve 43 and a bypass valve 44, all of which are used to adjust a locking and unlocking timing among the frictional coupling elements.

Lock-up control mechanism U, which may be of any well known type having a lock-up shift valve 91, a lock-up control valve 92, and first and second lock-up control solenoid valves 93 and 94, supplies pressurized working oil to the torque converter 3 through a pressure supply passage 95, returns the pressurized working oil in the torque converter 3 to an oil cooler 97 through a return passage 96, and supplies, if necessary, hydraulic pressure to the lock-up clutch 14 through a pressure passage 98.

The hydraulic pressure system FS controls the supply and release of hydraulic pressure for the frictional coupling elements according to the range positions of the manual valve 31 and the operated positions of the first to third solenoid valves 83, 85 and 87 so as to provide the ranges and the gear of the automatic transmission AT shown in TABLE I. TABLE II shows operating conditions of the first to third solenoid valve 83, 85 and 87 for the possible ranges and gears, such as park (P), reverse (R), neutral (N), drive (D), second (2nd) and first (1st) ranges and first (1st), second (2nd), third (3rd) and fourth (4th) gears.

It is to be noted that since hydraulic pressure is not supplied to any one of the first to third main pressure supply passages 63 to 65 and the reverse pressure passage 66 from the manual valve 31 in the park range and the neutral range, the hydraulic pressure is not supplied to any frictional coupling element in spite of the on and off states of the first to third solenoid valves 83, 85 and 87. Consequently, in these ranges, all the frictional coupling elements are kept unlocked, leaving the transmission gear mechanism 5 neutral, so as not to transmit any engine torque.

TABLE II

| Range | | First Solenoid Valve | Second Solenoid Valve | Third Solenoid Valve |
|---|---|---|---|---|
| Park | | OFF | ON | ON |
| Reverse | | OFF | OFF | ON |
| Neutral | | OFF | ON | ON |
| | | ON | OFF | OFF |
| Drive | 1st Gear | OFF | ON | ON |
| | 2nd Gear | ON | ON | ON |
| | 3rd Gear | ON | OFF | OFF |
| | 4th Gear | ON | OFF | ON |
| 2nd | 1st Gear | OFF | ON | ON |
| | 2nd Gear | ON | ON | OFF |
| | 3rd Gear | ON | OFF | OFF |
| 1st | 1st Gear | OFF | ON | OFF |
| | 2nd Gear | ON | ON | OFF |

Referring to TABLE II, paths of transmission of the hydraulic pressure in the hydraulic pressure mechanism FS in each range and shift gear will be explained.

(1) In the R (Reverse) range, the manual valve 31 occupies the reverse position. The first and second solenoid valves 83 and 85 are turned off, and the third solenoid valve 87 is turned on. Hydraulic pressure is supplied to the reverse clutch 25 through the reverse pressure passage 66 via the first branch passage 66a, so that the reverse clutch 25 is locked. The hydraulic pressure is also supplied to the low reverse brake 27 through the reverse pressure passage 66 via the 1-2 shift valve passage 66b, the second inlet and outlet ports 33b and 33d of the 1-2 shift valve 33, and the pressure passage 72, in this order, so that the low reverse brake 27 is locked. All other frictional coupling elements receive no hydraulic pressure and remain unlocked.

(2) In the D (Drive) range, first gear condition, the manual valve 31 occupies the drive position. Hydraulic pressure is supplied to the first and second main pressure supply passages 63 and 64. This operation is caused in second gear and in fourth gear in the drive range. The first solenoid valve 83 is turned on, and the second and third solenoid valves 85 and 87 are turned off. Hydraulic pressure is supplied to the forward clutch 21 through the first main pressure supply passage 63 and the pressure passage 63b, so that the forward clutch 21 is locked. All other frictional coupling elements are kept unlocked, because no hydraulic pressure is provided at the outlet ports of shift valves 33, 34 and 35.

(3) In the D (Drive) range, second gear condition, all of the first to third solenoid valves 83, 85 and 87 are turned on. The forward clutch 21 is locked. Hydraulic pressure is supplied to the 2-4 brake 26 at the lock pressure port 26q through the first main pressure supply passage 63, the pressure passage 63a and the pressure passage 71 via the first inlet and outlet ports 33a and 33c of the 1-2 shift valve 33. Since no unlock pressure is supplied to the unlock pressure port 26s, the 2-4 brake is locked. All other frictional coupling elements receive no hydraulic pressure and remain unlocked.

(4) In the D (Drive) range, third gear condition, the first solenoid valve 83 is turned on, and the second and third solenoid valves 85 and 87 are turned off. The forward clutch 21 is locked, and pressure is supplied to the 2-4 brake 26 at the lock pressure port 26q. However, since an unlock pressure is also supplied to the 2-4 brake 26 at the unlock pressure port 26s, the 2-4 brake 26 is unlocked. Hydraulic pressure is supplied to the 3-4 clutch 24 through the second main pressure supply passage 64 and the pressure passage 74 via the first inlet and outlet ports 34a and 34c of the 2-3 shift valve 34, so that the 3-4 clutch 24 is locked. Hydraulic pressure is supplied to the coast clutch through the pressure passage 74, the third connecting passage 78 via the second inlet and outlet ports 35b and 35d of the 3-4 shift valve 35, and the pressure passage 77, so that the coast clutch 23 is locked. The unlock pressure developed at the second outlet port 35d is supplied to the 2-4 brake 26 at the unlock pressure port 26s through the pressure passage 81, so that the 2-4 brake 26 is unlocked. The reverse clutch 25 and the low reverse brake 27 receive no hydraulic pressure and remain unlocked.

(5) In the D (Drive) range, fourth gear condition, the first and third solenoid valves 83 and 87 are turned on, and the second solenoid valve 8 is turned off. The forward clutch 21, the 2-4 brake and the 3-4 clutch 24 are all locked. All other frictional coupling elements receive no hydraulic pressure and remain unlocked.

(6) In the second (2nd) range, first gear condition, the manual valve 31 occupies the (2nd) range position. The pressure transmission path for the frictional coupling elements is formed in the same way as in the D (Drive) range, first gear condition.

(7) In the second (2nd) range, first gear condition, the first and second solenoid valves 83 and 85 are turned on, and the third solenoid valve 87 is turned off. The forward clutch 21 and the 2-4 brake are locked. Hydraulic pressure is supplied to the coast clutch 23 through the pressure passage 63b, the 3-4 shift valve 35 via the first inlet and outlet ports 35a and 35c, the first connecting passage 73, the 2-3 shift valve 34 via the second inlet and outlet ports 34b and 34d, the second connection passage 75, the ball valve 76, and the pressure passage 77, in this order, so that the coast clutch 23 is locked. All other frictional coupling elements receive no hydraulic pressure and remain unlocked.

(8) In the second (2nd) range, third gear condition, all of the frictional coupling elements are controlled in the same way as in the D (Drive) range, third gear condition.

(9) In the first (1st) range, first gear condition, the manual valve 31 occupies the first (1st) range position. Hydraulic pressure is supplied through the first and third main pressure supply passages 63 and 65. The first and third solenoid valves 83 and 87 are turned off, and the second solenoid valve 85 is turned on. The forward clutch 21 and the coast clutch 23 are locked. Hydraulic pressure is supplied to the low reverse brake 27 through the third main pressure supply passage 65, the low reducing valve 67, the ball valve 68, the 1-2 shift valve passage 66b, the 1-2 shift valve 33 via the second inlet and outlet ports 33b and 33d, and the hydraulic pressure passage 72, in this order, so that the low reverse brake 27 is locked. All other frictional coupling elements receive no hydraulic pressure and remain unlocked.

(10) In the first (1st) range, second gear condition, the manual valve 31 occupies the first (1st) range position. The pressure transmission path for the frictional coupling elements is the same as in the second (2nd) range, second gear condition.

As described above, according to combinations of locking and unlocking of the first to third solenoid valves 83 85 and 87 shown in TABLE II, lock and unlock patterns of the frictional coupling elements shown in TABLE I are established, so as to shift the automatic transmission AT into any desired range and gear.

Bypass valve 44, which is provided in a first bypass passage 102 bypassing a one-way orifice 101 incorporated in the pressure passage 74 extending to the 3-4 clutch, has a spool 44v and is formed with an inlet port 44a, an outlet port 44b, a pilot pressure chamber 44c and a control communication with the first bypass passage 102 disposed upstream of the valve 44. The outlet port 44b is in communication with the first bypass passage 102 disposed downstream of the valve 44. The pilot pressure chamber 44c is supplied with a pilot pressure from the pilot pressure passage 61. The control pressure chamber 44d is supplied with a hydraulic pressure through the pressure passage 74 extending to the 3-4 clutch.

When the automatic transmission AT shifts up from second gear to third gear in the D (Drive) range, the bypass valve 44 initially forces the spool 44v to its one extreme end of movement so that the inlet port 44a and the outlet port 44b are communicated with each other. The first bypass passage 102 abruptly supplies hydraulic pressure to the 3-4 clutch 24. However, when a hydraulic pressure in the pressure passage 74 downstream of the orifice 101, namely, a hydraulic pressure acting on the 3-4 clutch 24, goes beyond a predetermined pressure, a hydraulic pressure developed in the control pressure chamber 44d forces the spool 44v to the opposite extreme end of movement so as to shut off or disconnect the communication of pressure between the inlet port 44a and the outlet port 44b. Therefore, hydraulic pressure is slowly supplied to the 3-4 clutch 24 through the pressure passage 74 and the one-way orifice 101. In such a way, the bypass valve 44 adjusts the characteristics of pressure supply to the 3-4 clutch 24 as shown by a pressure line $H_3$ in FIG. 7.

The 3-4 shift valve 35 communicates, at the second outlet port 35d, with a pressure passage 104 to which the pressure passages 77 and 81 are joined. The pressure passage 104 branches off, downstream of a juncture 105, into two passages, namely, the pressure passage 81 and the pressure passage 77. The 2-3 timing valve 42 is provided in the pressure passage 104. A second bypass passage 106 is provided so as to bypass the 2-3 timing valve 42 and is provided with a one-way valve 107. The 2-3 timing valve 42 has a spool 42v and is formed with an inlet port 42a, an outlet port 42b, a pilot pressure chamber 42c, and a control pressure chamber 42d. The inlet port 42a is in communication with the pressure passage 104 upstream of the valve 42 and the outlet port 42b is in communication with the pressure passage 104 downstream of the valve 42. The pilot pressure chamber 42c is supplied with a pilot pressure through the pilot pressure passage 61, and the control pressure chamber 42d is supplied with a hydraulic pressure through the pressure passage 74.

Figure 7:
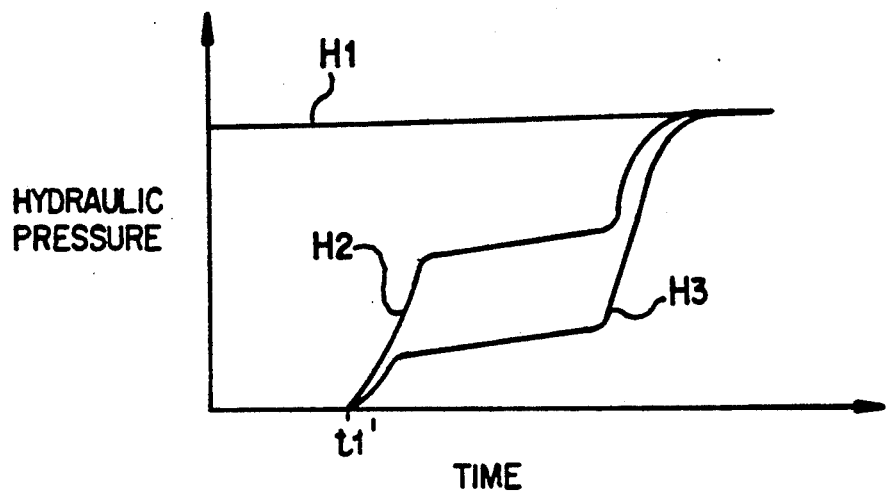
FIG. 7 is a time chart showing hydraulic pressure for the 2-4 brake and the 3-4 clutch upon a predetermined gear shift operation.

Referring to FIG. 7, which shows the characteristic curves of hydraulic pressure $H_1$, $H_2$ and $H_3$ at the lock pressure port 26q, the unlock pressure port 26s and the 3-4 clutch 24, respectively, relative to the passage of time, an up-shift operation of the automatic transmission AT starts at a time $t_1'$ and then is completed. As is apparent from FIG. 7, the 3-4 clutch 24 and the 2-4 brake 26 are locked and unlocked at appropriate timings, so that the automatic transmission AT does not cause coupling shocks and internal locking. The pressure passage 77 is provided with the coast timing valve 43, which controls the coast clutch 23 so that it is locked at a time after a time at which the 2-4 brake 26 is unlocked for the prevention of internal locking. The 3-2 timing valve 41 adjusts a timing at which the 2-4 brake 26 is locked and unlocked when the automatic transmission AT shifts down from, for instance, third to second gear.

Figure 8:
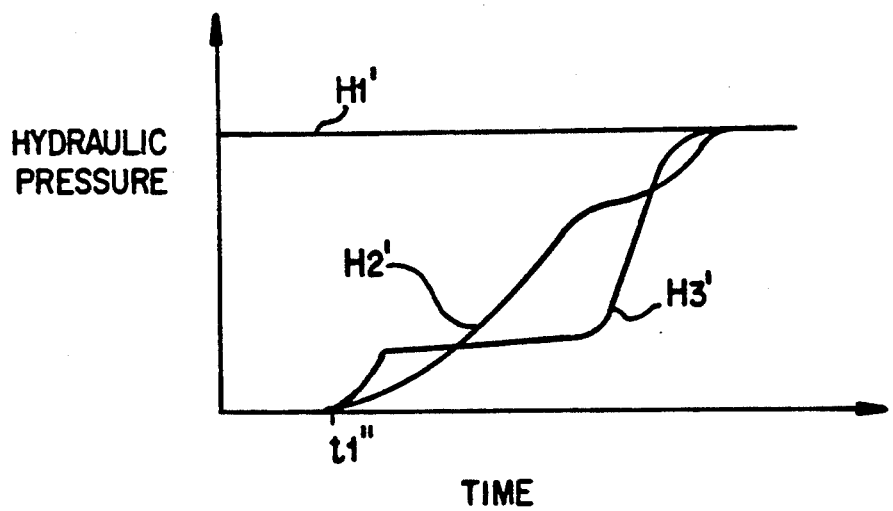
FIG. 8 is a time chart showing hydraulic pressure for the 2-4 brake and the 3-4 clutch in the event of air inclusion in oil at the 2-4 brake upon a first predetermined gear shift after engine ignition.

As was previously described, when the vehicle remains stopped for a long period of time, air may seep into or be "included" in oil of the hydraulic control system. If in fact the oil does have such air inclusion and the oil including the air is located at the unlock pressure port 26s of the 2-4 brake 26, a rise in unlock pressure in the pressure chamber 26p at the unlock pressure port 26s is delayed, largely due to the air inclusion. For example, as shown in FIG. 8, if an upshift of the automatic transmission from second gear to third gear starts at a time $t_1''$ while there is air inclusion in the oil at the unlock pressure port 26s of the 2-4 brake 26, hydraulic pressures $H_1'$, $H_2'$, and $H_3'$ are developed at the lock pressure port 26q, the unlock pressure port 26s, and the 3-4 clutch 24, respectively. Since a rise in pressure at the unlock pressure port 26s is greatly delayed, a large time delay for locking and unlocking is caused between the 3-4 clutch 24 and the 2-4 brake 26, so that a shift shock and internal locking are caused.

In order to prevent the occurrence of such shift shocks and internal locking, the automatic transmission control system of the present invention conducts a special control of the first to third solenoid valves 83, 85 and 87 when there is a high possibility of air inclusion in oil at the unlock pressure port 26s of the 2-4 brake 26. In the special control, the first to third solenoid valves 83, 85 and 87 are forced to operate in a special or first on-off switching pattern, which is different from an ordinary or second on-off switching pattern, as shown in TABLE III.

TABLE III

|  | 1st On-Off Switching Pattern | 2nd On-Off Switching Pattern |
| --- | --- | --- |
| 1st Solenoid Valve | ON→OFF→OFF→ON | ON→ON |
| 2nd Solenoid Valve | ON→OFF→OFF→OFF | ON→OFF |
| 3rd Solenoid Valve | ON→ON→OFF→OFF | ON→OFF |

Figure 5:
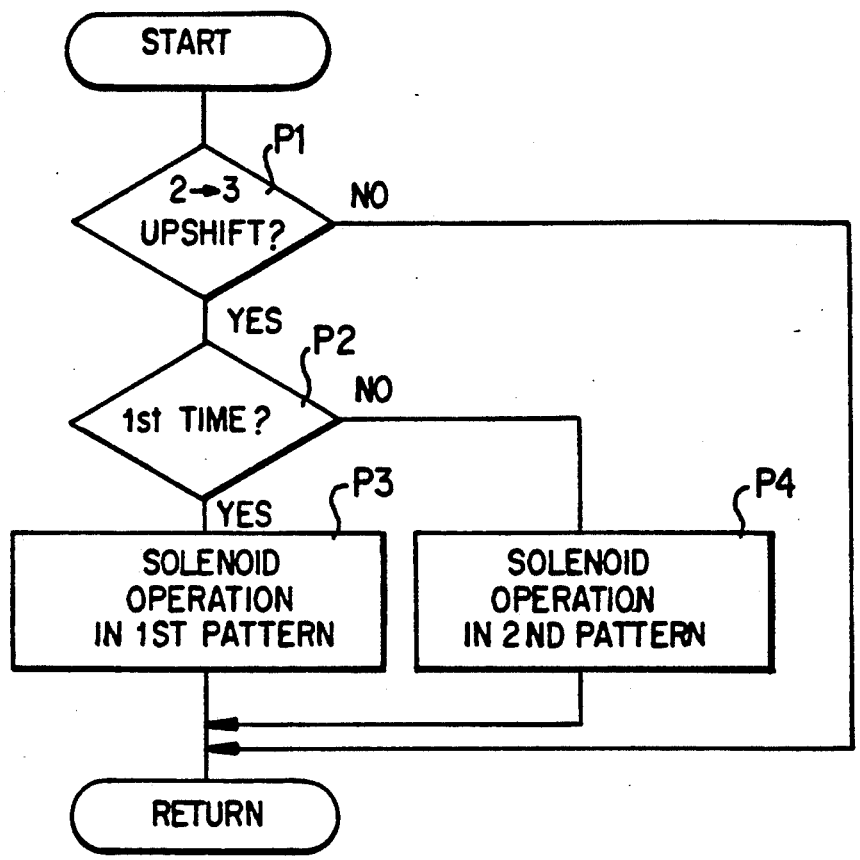
FIG. 5 is a flow chart illustrating a 2-4 brake control sequence for a microcomputer of a control unit.

The operation of the automatic transmission shown in FIGS. 1 to 3 is best understood by reviewing FIG. 5, which is a flow chart illustrating a solenoid valve control routine for a microcomputer of the control unit (CU) 32. Programming a computer is a skill well understood in the art. The following description is written to enable a programmed having ordinary skill in the art to prepare an appropriate program for the microcomputer. The particular details of any such program would, of course, depend upon the architecture of the particular computer selected.

Referring to FIG. 5, the first step P1 is to make a decision as to whether or not an up-shift of the automatic transmission AT is needed from, for instance, second gear to third gear. This decision may be made based on vehicle driving conditions, such as a throttle valve opening and a vehicle speed with reference to a pre-designed transmission shift control pattern in a well known manner. The decision at step P1 is repeated until the answer is "YES."

When the answer to the decision becomes "YES," this indicates that an up-shift from second gear to third gear is needed. Then, another decision is made at step P2 as to whether or not the upshift from second to third gear is occurring for the first time after engine ignition. If the answer to the decision made at step P2 is "NO," it is assumed that there is no air inclusion in the oil at the unlock pressure port 26s. Then, the first to third solenoid valves 83, 85 and 87 are controlled so that they turn on and off in the ordinary or second on-off switching pattern shown in TABLE III. As is apparent from TABLE III, in the second on-off switching pattern, after the first to third solenoid valves 83, 85 and 87 have turned on, the second and third solenoid valves 85 and 87 turn off at a time $t_1'$ while the first solenoid valve 83 is left turned on. This ordinary control of the first to third solenoid valves 83, 85 and 87 conducts a suitable change of hydraulic pressure for the second to third gear up-shift, so that no shift shock on internal locking is caused. The 2-4 brake 26 is controlled, by the 2-3 timing valve 42, to turn off, as mentioned previously. The first step of the control orders return to the first step.

Figure 6:
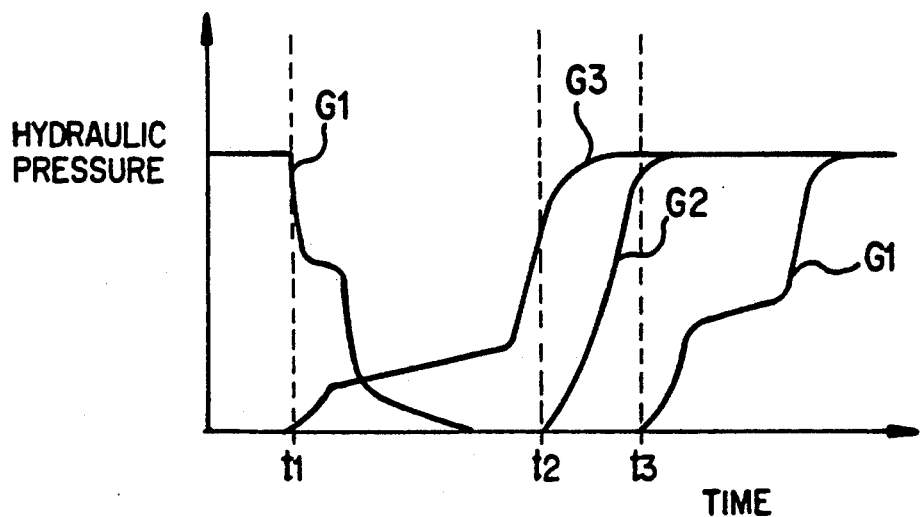
FIG. 6 is a time chart showing hydraulic pressure for a 2-4 brake and a 3-4 clutch for a first predetermined gear shift operation after engine ignition.

If the answer to the decision made at step P2 is "YES," this indicates that the second to third gear upshift is occurring for the first time after engine ignition. Then, the control unit (CU) 32 controls the first to third solenoid valves 83, 85, and 87 by the special or first on-off switching pattern shown in TABLE III. As is shown in FIG. 6, when the second to third gear up-shift is started at a time $t_1$, hydraulic pressures $G_1$, $G_2$ and $G_3$ are developed at the lock pressure port 26q, the unlock pressure port 26s, and the 3-4 clutch 24, respectively. Before the start of the second to third gear upshift of the automatic transmission AT, all of the first to third solenoid valves 83, 85 and 87 remain turned on, which establishes the second gear arrangement in the automatic transmission AT. At the start of the second to third gear up-shift at the time $t_1$, the first and second solenoid valves 83 and 85 turn off while the third solenoid valve 87 is still left turned on. The third solenoid valve 87 turns off at a time $t_2$. Finally, at a time $t_3$, only the first solenoid valve 83 turns on while the second and third solenoid valves 85 and 87 remain turned off. This establishes the third gear arrangement in the automatic transmission AT. In the control of the first to third solenoid valves 83, 85, and 87 by the first on-off switching pattern, at the time $t_1$, the first solenoid valve for the 1-2 shift valve 33 turns off so as to cause the 1-2 shift valve 33 to release the lock pressure from the 2-4 brake 26 at the lock pressure port 26q through the pressure passage 71, thereby unlocking the 2-4 brake 26 a little while after the time $t_1$. The second solenoid valve 85 for the 2-3 shift valve 34 also turns off at the time $t_1$, so as to cause the 2-3 shift valve 34 to supply hydraulic pressure to the 3-4 clutch 24 through the pressure passage 74. Since the bypass valve 44 adjusts the hydraulic pressure delivered toward the 3-4 clutch 24, the hydraulic pressure rises in the same way as a hydraulic pressure controlled according to the ordinary or first on-off switching pattern, as shown in FIG. 7. Accordingly, the 3-4 clutch 24 is locked after the 2-4 brake 26 unlocks, which eliminates any internal locking.

At the time $t_2$, the third solenoid valve 89 for the 3-4 shift valve 35 turns off, so as to cause the 3-4 shift valve 35 to supply an unlock pressure to the unlock pressure port 26s through the pressure passage 81. Since the hydraulic pressure in the hydraulic pressure passage 74 has already become high, the 2-3 timing valve 42 communicates the inlet and outlet ports 42a and 42b with each other, and the lock pressure is released from the 2-4 brake 26 at the lock pressure port 26q, so that an unlock pressure is abruptly introduced into the pressure chamber 26p at the unlock pressure port 26s. Thereafter, the first solenoid valve 83 turns on again at the time $t_3$, so that introduction of a lock pressure into the pressure chamber 26p resumes again through the lock pressure port 26q, thereby locking the 2-4 brake 26 to complete the second to third gear up-shift.

As is apparent from the above description, when the control of the first to third solenoid valves by the first on-off switching pattern is conducted, unlocking of the 2-4 brake 24 is controlled by releasing the lock pressure from the pressure chamber 26p of the 2-4 brake 26 at the lock pressure port 26q. Therefore, even if there is air inclusion in oil at the unlock pressure port 26s, the 2-4 brake 26 is unlocked precisely without accompanying shift shocks and internal locking.

Figure 4:
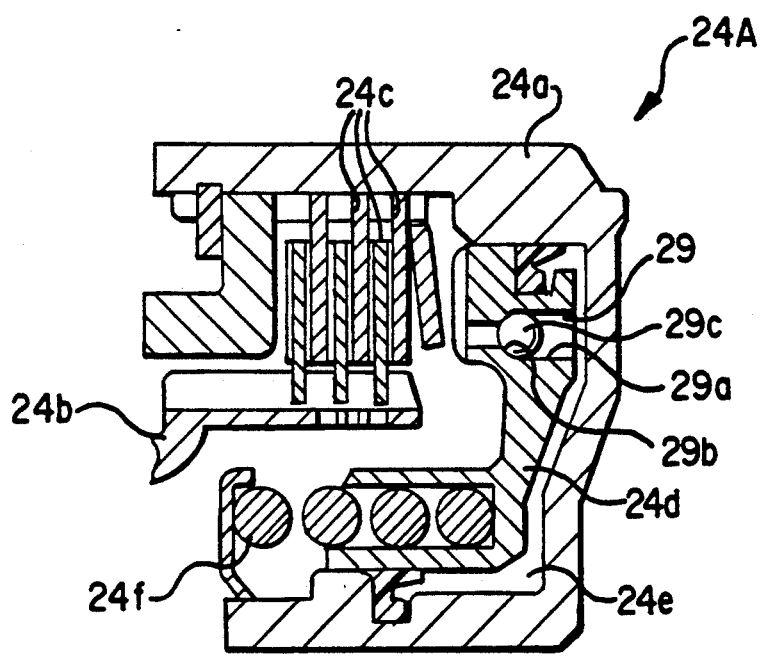
FIG. 4 is a cross-sectional view of a drift-on-ball type of 3-4 clutch installed in the automatic transmission of FIG. 1.

The 3-4 clutch 24 may be of any known type. For instance, the 3-4 clutch 24 may be a drift-on-ball type 3-4 clutch as shown in FIG. 4. A 3-4 clutch 24A of this type is formed by first or outer and second or inner drums 24a and 24b, a plurality of clutch plates 24c disposed between the first and second drums 24a and 24b, and a piston 24d in which a drift-on-ball 29c is received. The first drum 24a is fastened to the turbine shaft 2 of the converter 3, and a second drum 24b is fastened to the carrier 20 of the planetary gearset 5 disposed in front of the long pinion gear 18. The piston 24d is snugly, fluid-tightly fitted into the first drum 24a so as to slide therein. A set of alternate clutch plates 24c is internally spline-coupled to the first drum 24a, and another set of alternate clutch plates 24c is externally spline-coupled to the second drum 24b. The 3-4 clutch 24A is provided with a pressure chamber 24e between the piston 24d and the first drum 24a. A return spring 24f is installed within the first drum 24a so as to force the piston 24d to reduce the volume of the pressure chamber 24e. The piston 24d is formed with a stepped bore 29a penetrating therethrough, which has a large diameter rear bore portion and a small diameter front bore portion connected by a tapered transitional part 29b. The drift-on-ball, 29c is received and slides in the large diameter bore portion 29a of the bore 29c. When the drift-on-ball 29 is seated on the tapered transitional part 29b, it fluid-tightly closes the small diameter front bore portion of the bore 29. The automatic transmission AT having the drift-on-ball type 3-4 clutch 24 is actuated or locked and unlocked by the hydraulic control system shown in FIG. 3.

Figure 9:
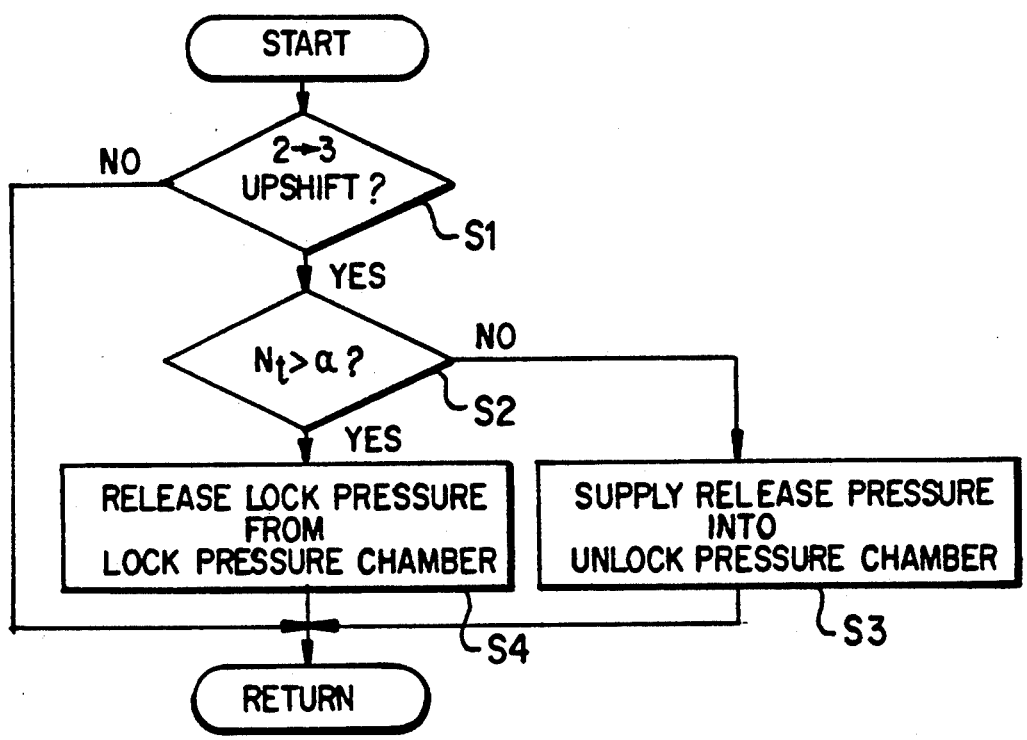
FIG. 9 is a flow chart illustrating a 3-4 clutch control sequence for the microcomputer of the control unit.

The operation of the automatic transmission shown in FIGS. 1 to 4 is best understood by reviewing FIG. 9, which is a flow chart illustrating a solenoid valve control routine for a microcomputer of the control unit (CU) 32.

Figure 11:
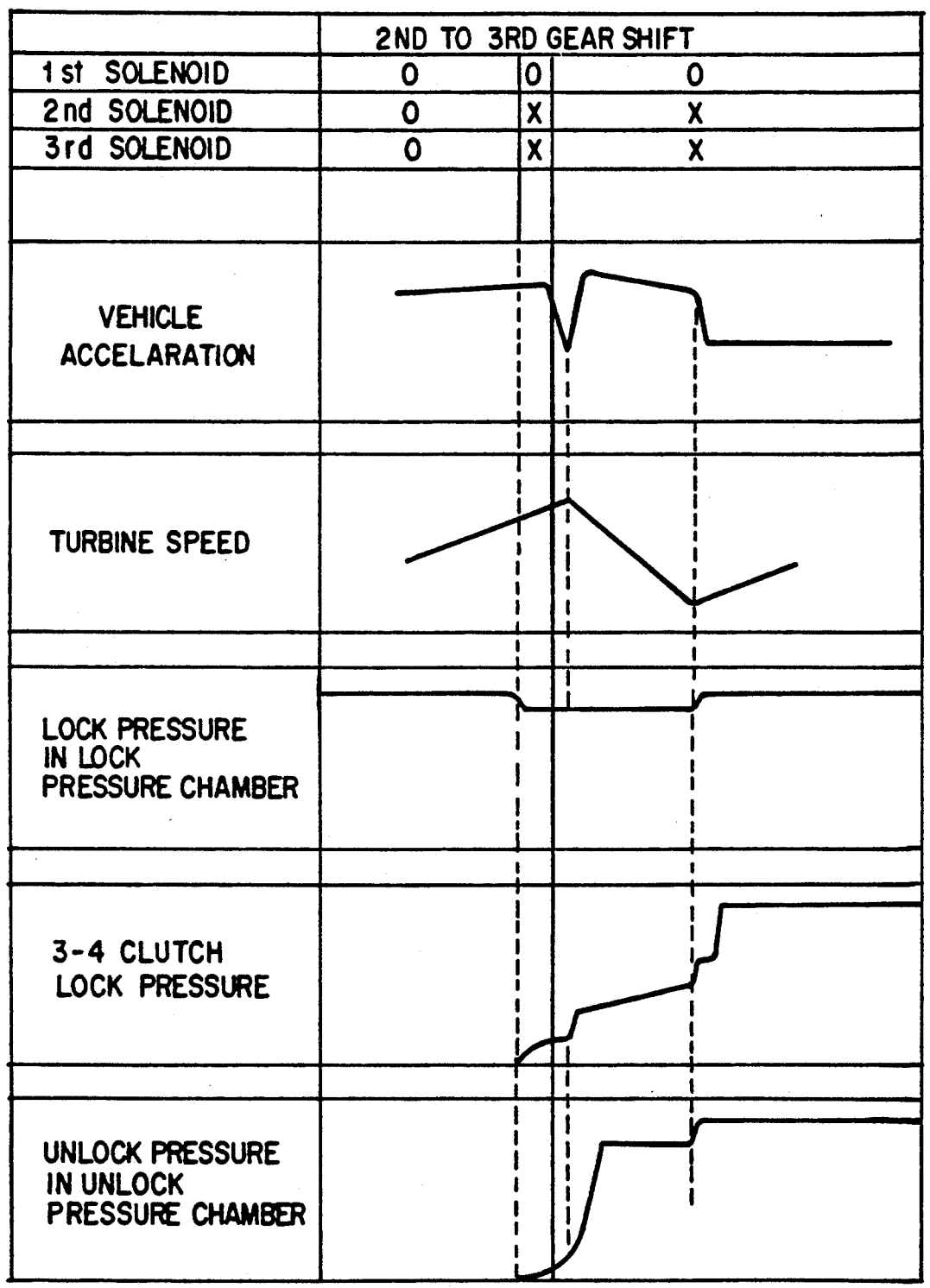
FIG. 11 is a time chart of operation of solenoid valves for the 3-4 clutch, during a second to third gear shift of the automatic transmission, when a turbine speed is lower than a predetermined speed.
Figure 12:
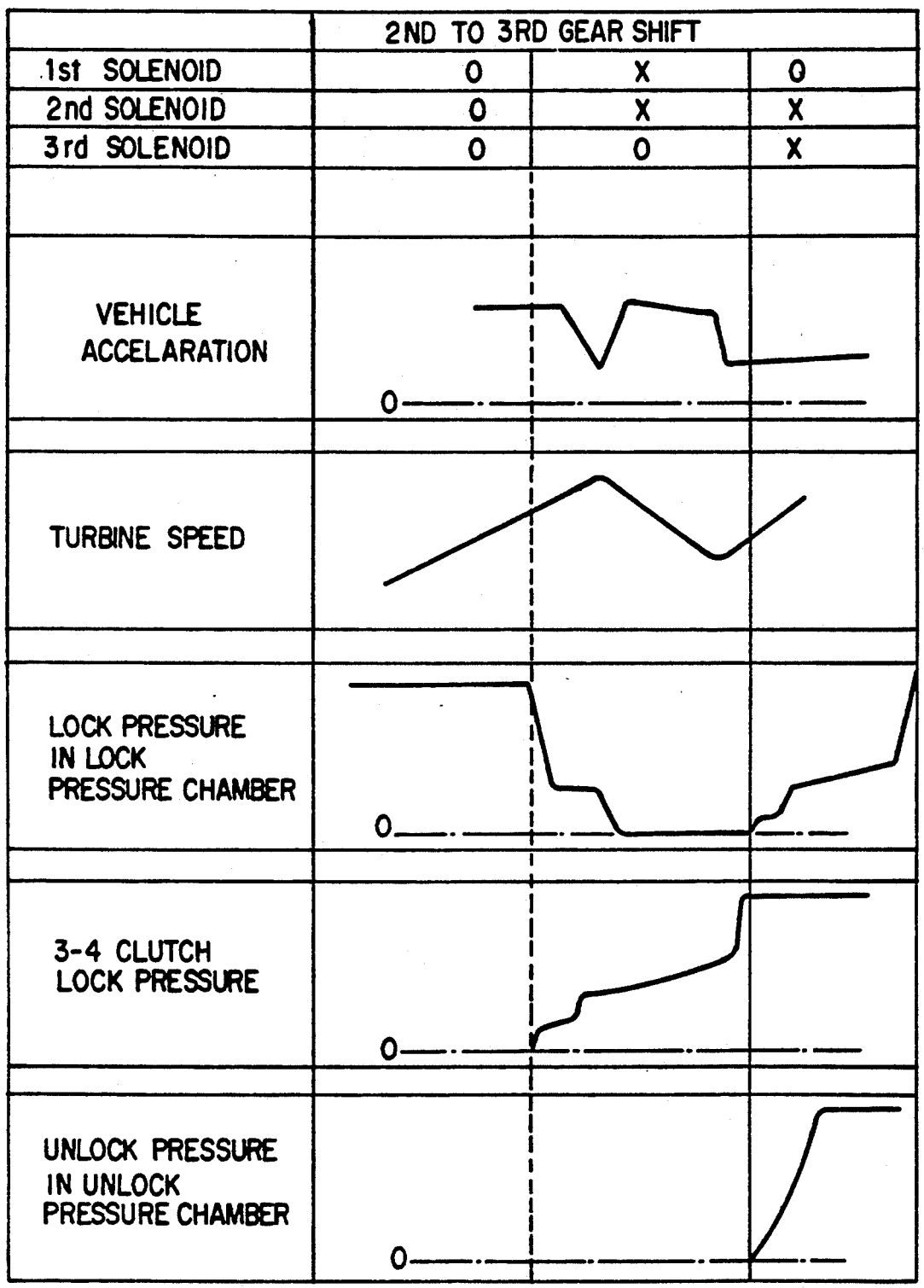
FIG. 12 is a time chart of operation of solenoid valves for the 3-4 clutch during a second to third gear shift of the automatic transmission, when the turbine speed is higher than a predetermined speed.

Referring to FIG. 9, the first step S1 is to make a decision based on drive conditions, such as a throttle valve opening and a vehicle speed, as to whether or not a second to third gear shift is needed. This decision is carried out with reference to a pre-designed transmission shift control pattern in a well known manner. This decision is repeated until the answer becomes "YES." When in fact the answer to the decision made at step S1 becomes "YES," another decision is made at step P2 as to whether or not a turbine speed Nt of the torque converter 3 has reached a predetermined speed $\alpha$. If the answer to the decision made at step P2 is "NO," this indicates that the turbine speed Nt is not yet beyond the predetermined speed $\alpha$. Then, an unlock pressure is supplied to the pressure chamber 26p at the unlock pressure port 26s so as to unlock the 2-4 brake 26 simultaneously with locking of the 3-4 clutch 24A at step S3. Locking of the 3-4 clutch 24A is performed by controlling the first to third solenoid valves 83, 85 and 87 as shown in FIG. 11. That is, the second solenoid valve 85 is turned off so as to supply a line pressure to the 3-4 clutch 24 through the pressure passage 74 via the 2-3 timing valve 42. Simultaneously, in order to unlock the 2-4 brake 26, as shown in FIG. 11, the third solenoid valve 87 is turned off so as to supply an unlock pressure to the pressure chamber 26p of the 2-4 brake 26 at the unlock pressure port 26s through the pressure passages 78 and 81 via the 3-4 shift valve 35, while the first solenoid valve 83 is kept turned on so as to keep the pressure chamber 26p of the 2-4 brake 26 supplied with the pressure at the lock pressure port 26q through the pressure passage 71. When the answer to the decision made at step S2 is "YES," this indicates that the turbine speed Nt has reached the predetermined speed $\alpha$. Then, at step S4, the 3-4 clutch 24 is engaged in the same manner as in step S3. The 2-4 brake 26, however, is also unlocked at step S4 by releasing the unlock pressure from the pressure chamber 26p at the unlock pressure port 26s. Unlocking of the 2-4 brake 26 is performed by on-off controlling the first to third solenoid valves 83, 85 and 87 as shown in FIG. 12. That is, while the solenoid valve 87 is kept turned on so as to cause 3-4 shift valve 35 to release the unlock pressure from the pressure chamber 26p of the 2-4 brake 26 at the unlock pressure port 26s through the pressure passage 81, the first solenoid valve 83 is turned off so as to cause the 1-2 shift valve 33 to release the lock pressure from the pressure chamber 26q the 2-4 brake 26 through the hydraulic pressure passage 71, thereby allowing the piston 26b of the 2-4 brake 26 to be forced by the spring 26c toward the unlock position. After unlocking of the 2-4 brake 26 is completed, the first solenoid valve 83 is turned on, and the third solenoid valve 87 is turned off so as to introduce an unlock pressure into the pressure chamber 26p of the 2-4 brake 26 at the lock pressure port 26q through the pressure passage 71 via the 1-2 shift valve 33 as well as an unlock pressure into the pressure chamber 26p at the unlock pressure port 26s through the pressure passage 81 via the 3-4 shift valve 35. The 2-4 brake 26 is thereby held unlocked. The steps S3 and S4 both order a return to the first decision.

As is apparent from the above description, when the turbine 10 of the torque converter 3 increases its speed Nt past the predetermined speed $\alpha$ during an up-shift, for instance, from second to third gear, a lock pressure is introduced into the pressure chamber 24e of the 3-4 clutch 24 through the pressure passage 74 via the 2-3 shift valve 42 as a result of turning the second solenoid valve 85 off. The pressure forces the piston 24d against the return spring 24f so as to friction-couple the clutch plates 24c with one another, thereby locking the 3-4 clutch 24. At this time, while the third solenoid valve 87 is kept turned on so as to leave the pressure chamber 26p of the 2-4 brake 26 with the unlock pressure released through the hydraulic passage 81 via the 3-4 shift valve 35, the first solenoid valve 83 is turned off, so as to release the lock pressure from the pressure chamber 26q the brake 26 at the lock pressure port 26q through the pressure passage 71 via the 1-2 shift valve 33. The 2-4 brake 26 is thereby unlocked.

Figure 10:
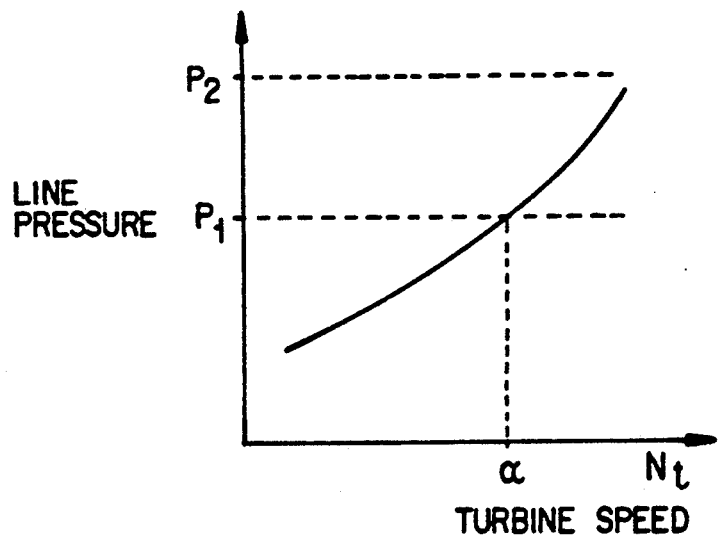
FIG. 10 is a diagram showing locking force necessary to lock the 3-4 clutch relative to turbine speed.

Since unlocking of the 2-4 brake is performed by releasing the lock pressure from the pressure chamber 26p at the lock pressure port 26q, the line pressure is supplied to the pressure chamber 24e of the 3-4 clutch 24 only during a second gear to third gear up-shift. A large amount of oil is thereby allowed to act on the piston 24d of the 3-4 clutch 24. As a result, when the turbine speed Nt goes beyond the predetermined speed a so that a strong centrifugal force is applied to the drift-on-ball 29c of the 3-4 clutch 24, even if a pressure necessary to seat the ball 29c of the drift-on-ball mechanism 29 on the seat 29b and fluid-tightly close the bore 29 exceeds a maximum line pressure $P_1$ generated at the regulating valve 50 as shown in FIG. 10, the force acting on the piston 24d becomes higher than the line pressure because a large amount of oil is supplied into the pressure chamber 24e of the 3-4 clutch 24. Thus, the drift-on-ball 29c of the drift-on-ball mechanism 29 is urged against the seat 29b with a force sufficiently strong to fluid-tightly close the bore 29a. As a result, the 3-4 clutch 24 is locked with certainty, providing improved operational reliability.

On the other hand, when a second gear to third gear up-shift is needed but the turbine speed Nt is lower than the predetermined speed a, or if a force necessary to seat the drift-on-ball 29c of the 3-4 clutch 24 on the seat 29b is less than the maximum line pressure $P_1$ generated at the regulating valve 50, the 2-4 brake 26 is unlocked by a supply of unlock pressure to the pressure chamber 26p of the 2-4 brake 26 at the unlock pressure port 26s, as shown in FIG. 11. During unlocking of the 2-4 brake 26, in spite of a drop in the amount of the working oil introduced into the pressure chamber 24e of the 3-4 clutch 24, which is equivalent to the amount of the working oil introduced into the pressure chamber 26p of the 2-4 brake 26 at the unlock pressure port 26s, the drift-on-ball 29c is inherently urged against the seat 29b with a force less than the maximum line pressure $P_1$ so as to close fluid-tightly the bore 29a, thereby ensuring locking of the 3-4 clutch 24.

Furthermore, when the 2-4 brake 26 is unlocked by supplying an unlock pressure to the pressure chamber 26p of the 2-4 brake 26 at the unlock pressure port 26s, the unlock pressure rises in response to a rise of a locking pressure for the 3-4 clutch 24 through the 2-3 timing valve 42. This assures a correlated progress between the locking of the 3-4 clutch 24 and the unlocking of the 2-4 brake 26 so as to smoothly change from one torque transmission path of the transmission gear mechanism 5 to another and thereby to effectively reduce shift shocks.

It is to be understood that although the present invention has been described in detail with respect to a preferred embodiment thereof, various other embodiments and variants may occur to those skilled in the art. Any such other embodiments and variants which fall within the spirit and scope of the invention are intended to be covered by the following claims.

What is claimed is:

1. A control system for controlling a shift operation of an automatic transmission for an automotive vehicle comprising:

a first frictional coupling element which is locked under hydraulic pressure;

a second frictional coupling element provided with a lock pressure chamber and an unlock pressure chamber, said second frictional coupling element being locked when hydraulic pressure is developed in said lock pressure chamber only and unlocked when hydraulic pressure is developed in said unlock pressure chamber only and when hydraulic pressure is released from both said lock pressure chamber and said unlock pressure chamber; and control means for supplying hydraulic pressure to said first frictional coupling element, so as to lock said first frictional coupling element, and releasing hydraulic pressure from said lock pressure chamber of said second frictional coupling element while keeping hydraulic pressure released from said unlock pressure chamber, so as to unlock said second frictional coupling element, when it is necessary for said automatic transmission to shift into a predetermined gear.

2. A control system as defined in claim 1, wherein said first frictional coupling element comprises a frictional clutch which is locked for a third gear and a fourth gear in a drive range and said second frictional coupling element comprises a frictional brake which is locked for a second gear and said fourth gear in said drive range.

3. A control system for controlling a shift operation of an automatic transmission for an automotive vehicle comprising:

a first frictional coupling element, said first frictional coupling element being locked under hydraulic pressure;

a second frictional coupling element provided with a lock pressure chamber and an unlock pressure chamber, said second frictional coupling element being locked when hydraulic pressure is developed in said lock pressure chamber only and unlocked when hydraulic pressure is developed in said unlock pressure chamber and when hydraulic pressure is released from both said lock pressure chamber and said unlock pressure chamber; and control means for (a) supplying hydraulic pressure to said first frictional coupling element so as to lock said first frictional coupling element, (b) releasing hydraulic pressure from said lock pressure chamber of said second frictional coupling element so as to unlock said second frictional coupling element when it is necessary for said automatic transmission to shift into a predetermined gear, (c) detecting an input speed of said automatic transmission to release hydraulic pressure from said lock pressure chamber of said second frictional coupling element so as to unlock said second frictional coupling element when it is necessary for said automatic transmission to shift into a predetermined gear when input speeds of said automatic transmission higher than a predetermined speed are detected and (d) supplying hydraulic pressure into said unlock pressure chamber of said second frictional coupling element so as to unlock said second frictional coupling element when it is necessary for said automatic transmission to shift into a predetermined gear when input speeds of said automatic transmission which are lower than said predetermined speed are detected.

4. A control system as defined in claim 3, wherein said first frictional coupling element comprises a frictional clutch which is locked for a third gear and a fourth gear in a drive range, and said second frictional coupling element comprises a frictional brake which is locked for a second gear and said fourth gear in said drive range.

* * * * *